United States Patent [19]

Derujinsky

[11] Patent Number: 4,900,048

[45] Date of Patent: Feb. 13, 1990

[54] INTEGRAL SEAMLESS COMPOSITE BICYCLE FRAME

[76] Inventor: Gleb Derujinsky, 31505 U.S. Highway 160, Durango, Colo. 81301

[21] Appl. No.: 105,121

[22] Filed: Oct. 2, 1987

[51] Int. Cl.$^4$ .............................................. B60K 19/16
[52] U.S. Cl. ................................ 280/281.1; 138/116; 138/130; 138/DIG. 2; 428/36.3
[58] Field of Search .................... 280/281 R, 270, 274, 280/279, 281 B, 281.1; 138/115, 116, 117, 130, 172, DIG. 2; 272/DIG. 23; 428/36.3, 36.9

[56] References Cited

U.S. PATENT DOCUMENTS

| | | | |
|---|---|---|---|
| 2,493,037 | 1/1950 | Simon | 280/281 R |
| 2,723,705 | 11/1955 | Collins | 156/77 |
| 2,878,038 | 3/1959 | Noland | 285/55 |
| 3,021,246 | 2/1962 | Hutter | 156/196 |
| 3,574,104 | 4/1971 | Medler | 428/222 |
| 3,715,252 | 2/1973 | Fairbairn | 156/162 |
| 3,833,242 | 9/1974 | Thompson | 280/281 R |
| 3,873,391 | 3/1975 | Plauka | 156/258 |
| 3,969,557 | 7/1976 | Jenks' | 428/36 |
| 4,007,075 | 2/1977 | McClain et al. | 156/62.2 |
| 4,015,854 | 4/1977 | Ramond | 280/281 R |
| 4,047,731 | 9/1977 | Van Auken | 280/281 B |
| 4,082,277 | 4/1978 | Van Auken | 273/80 R |
| 4,097,626 | 6/1978 | Tennent | 428/36 |
| 4,187,135 | 2/1980 | Yates et al. | 156/187 |
| 4,236,386 | 12/1980 | Yates et al. | 464/181 |
| 4,273,601 | 6/1981 | Weingart | 156/189 |
| 4,289,557 | 9/1981 | Stanwood | 156/171 |
| 4,437,679 | 3/1984 | Campagnolo | 280/281 R |
| 4,493,749 | 1/1985 | Brezina | 156/187 |
| 4,513,986 | 4/1985 | Trimble | 280/281 R |
| 4,555,113 | 11/1985 | Shimazaki et al. | 273/80 B |
| 4,657,795 | 4/1987 | Foret | 428/36 |

FOREIGN PATENT DOCUMENTS

| | | | |
|---|---|---|---|
| 2576576 | 8/1986 | France | 280/281 R |
| 2195072 | 8/1987 | Japan | 280/281 R |

OTHER PUBLICATIONS

"Sanderson Outruns . . . ", Anchorage Daily News, May 13, 1985, p. C–10.
The Trimble Composite Bike, Bicycle Guide, Dec. 1985, p. 74.
Bicycling Magazine, Jul. 1986, pp. 66–68, 70–72, 74, 78–79.
Bicycling Magazine, Jun. 1987, cover & pp. 40, 42, 160, 162.
Bicycle Guide Magazine, Aug. 1987, Future, pp. 20–29, Kestrel 4000, pp. 30–35, Look Kevlar 2000, pp. 36–39 and 68.

*Primary Examiner*—John A. Pekar
*Attorney, Agent, or Firm*—Kenton L. Freudenberg; Maxwell C. Freudenberg

[57] ABSTRACT

A bicycle frame made essentially entirely of an integrally bonded composite structure throughout its main structural tubular members and at the joints securing these tubular members to each other. The tubular members, which have round and aero cross sections, and the joints are laid up using layers and strips of high strength resin-impregnated unidirectional carbon fiber fabric. A non-compressible filler material is added at the joints to support the carbon fiber fabric so that its outer surfaces are all non-concave wherever possible.

40 Claims, 12 Drawing Sheets

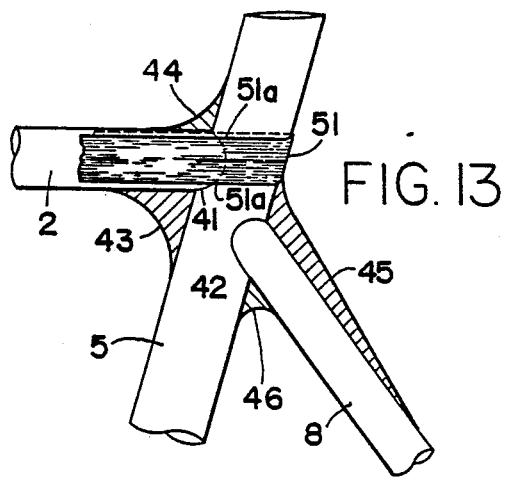
FIG. 13
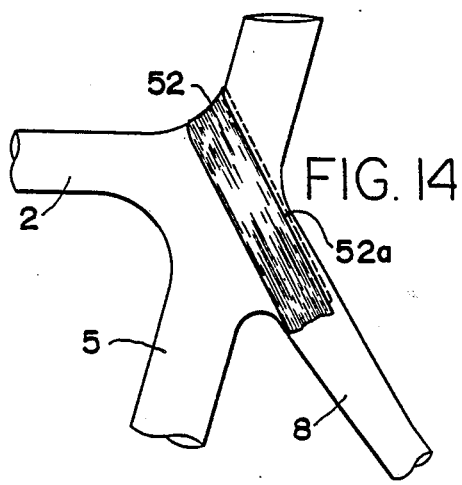
FIG. 14
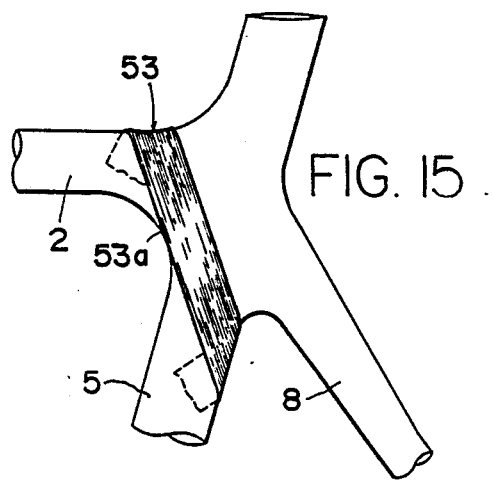
FIG. 15
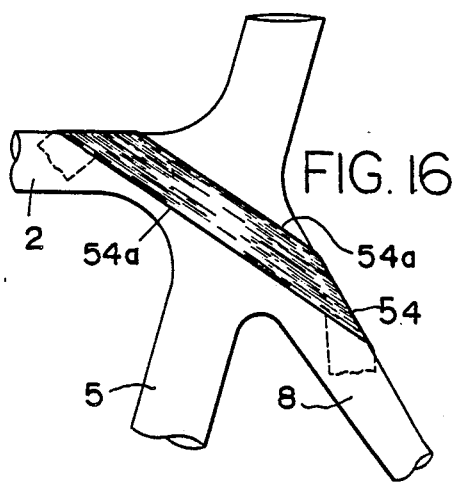
FIG. 16
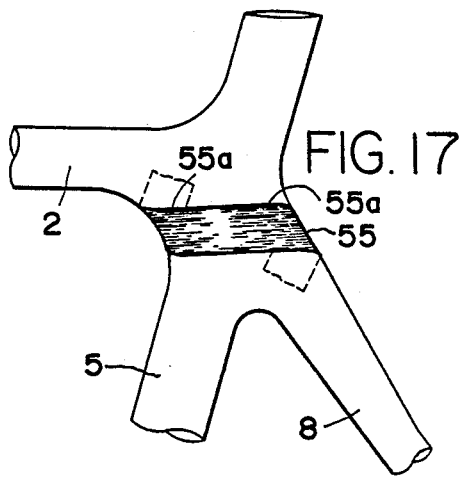
FIG. 17
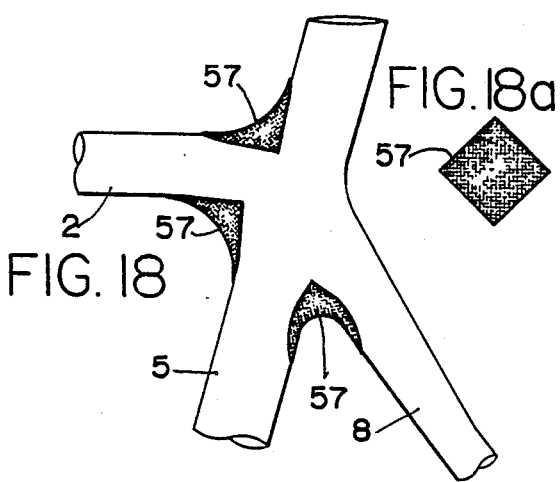
FIG. 18
FIG. 18a

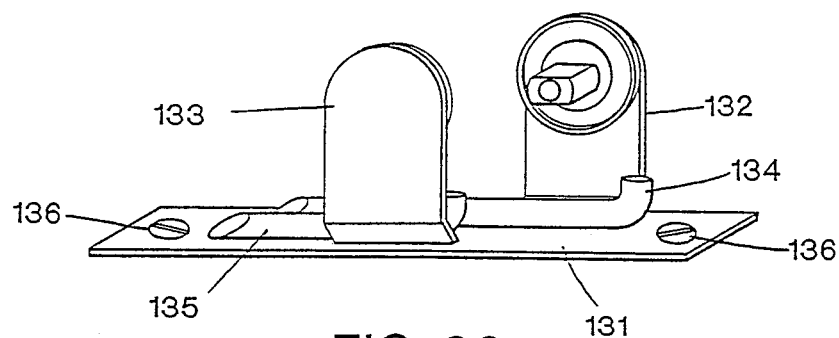
FIG. 38
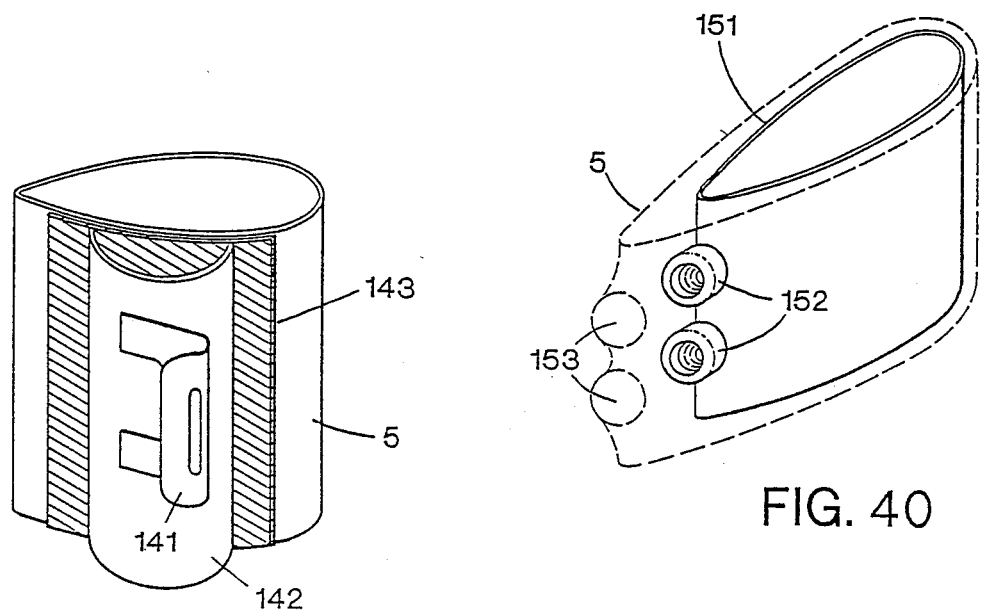
FIG. 39
FIG. 40

INTEGRAL SEAMLESS COMPOSITE BICYCLE FRAME

This invention relates to an improved bicycle frame and its method of integrated manufacture of all principal components from composite material using carbon fibers whereby high efficiency in the transfer of power from the rider to propulsion of the rider and the bicycle is achieved in a light and strong bicycle which is comfortable to ride.

BACKGROUND OF THE INVENTION

For most of the historical life of bicycles the frames were made by assembling metal tubes in the familiar configuration comprising: a generally horizontal top tube connected at its front end to a relatively short head tube and at its rear end to the upper end of a seat tube, a down tube connected to the head tube and extending downwardly and rearwardly to a bottom bracket where the seat tube and the down tube are connected, and pairs of tubular seatstays and chainstays extending rearwardly on opposite sides of the rear wheel area from the upper end of the seat tube and from the bottom bracket, respectively, to dropouts which interconnect the stays and support the rear axle of the bicycle. In a custom made frame the lengths of the top tube and the seat tube and the angle of the seat tube with respect to the horizontal are closely dependent on the size of the rider. The angle of the head tube with respect to the horizontal is dependent on the desired steering characteristics. The length and angle of the chainstays depend on both the height of the frame above the ground and the desired riding stiffness and pedaling efficiency. Thus there are many variable dimensions which must be accommodated in making a frame for a particular rider's size and performance needs.

In recent years through the use of reinforcing lugs to aid in interconnecting tubes, and through the use of improved aluminum and steel alloys and titanium for tubes, stronger and lighter weight frames became available. However the strength of these metal materials can be easily exceeded on a strength to weight ratio by composite structures such as carbon, boron, aramid and other synthetic non-metallic fibers bound together with suitable resins. Tubes made from such synthetic fibers have been used in frames to replace the top, down, seat and stay tubes, but there remains a problem in anchoring the ends of the tubes to the other components of the frame with sufficient strength at the joints to accept the high stresses thereat without structural failure.

The strength of a frame and its stiffness properties are dependent on both the strength of the frame where the tubes are interconnected and on the strength of the tubes themselves along their lengths. Two tests for measuring frame strength and stiffness as parameters of well-known frame riding characteristics are described in U.S. Pat. No. 4,500,103 to Klein. These tests are called Bottom Bracket Torsion Test and Lateral Bending Stiffness Test. Klein merely states that the various parts of the frame are attached in a suitable manner so as not to lose strength or rigidity at the joints. His preferred configuration uses welded or brazed joints with subsequent heat treatment where applicable with possible use of lugs which are well known. Klein mention, but does not illustrate nor describe, other joining devices or means. Moreover, although Klein mentions possible use of carbon, boron or other synthetic fibers, he does not disclose any method of making a frame of such materials which meets his selected test parameters.

SUMMARY OF THE INVENTION

This invention achieves high pedaling efficiency, and a comfortable ride in which road shocks and vibrations are absorbed or dampened, by providing a bicycle frame in which all the main structural parts are integrally formed of and integrally secured together by extremely high strength synthetic fibers imbedded in a bonding resin.

Among the objects of this invention is to provide standard size tubular components of composite material which can be selected and trimmed to appropriate lengths for a particular frame design and assembled with specially configured joint constructions of similar composite material to achieve an integral frame structure in which the torsional and bending stresses are properly resisted in the tubes and in which the stresses at the joints are distributed and applied so that a maximum use of the high tensile strength of the fibers in the composite is availed of.

Another object of the invention is to provide an improved process for joining composite tubes of different thicknesses using laid up high tensile strength fibers which are positioned in a tube-securing relationship wherein the principal stresses on the fibers act essentially longitudinally of the individual fibers in a sufficiently large group of the fibers to adequately resist the stresses without failure of the structure at the joint and while keeping the amount of material and its weight at the joint at a minimum.

Another object of the invention is to provide an improved composite tubular structure which has both longitudinal fibers extending parallel to the tube axis primarily to resist bending stresses and fibers spiralled in opposite directions around the tube axis primarily to resist torsion stresses.

A further object of the invention is to provide a tube of composite material in which the resistance to bending stresses varies over different longitudinal portions of the tube.

Still another object of the invention is to provide a unique combination of differently configured tube structures of composite materials which cooperate to adequately resist both bending and torsional stresses imposed on a bicycle frame primarily by the pedaling forces of the rider, particularly when the rider is out of the saddle during hill climbing or sprinting.

Another object of the invention is to provide improved tapered chainstay tubes of composite material where the size of the tubes where they are joined to a composite shell containing the bottom bracket aids in the transfer of stresses between the tubes and the bottom bracket shell primarily along the length of the fibers in the tubes and in the shell.

A further object of the invention is to provide improved aerodynamic qualities for a bicycle frame and for the structural components thereof.

A further object of the invention is to provide improved means for protecting or concealing operating mechanisms for brake and shifting components such as levers and cables within portions of a bicycle frame.

DESCRIPTION OF THE DRAWINGS

The main structural elements of the bicycle frame may be tubular members having generally round or circular cross sections. However, in some instances it may be preferable that one or more of the tubular members have a cross section to provide improved aerodynamic qualities or reduced resistance to air flow thereacross and for such a tube the term aero tube will be used hereinafter through out the specification.

FIG. 13 is a side view of a bicycle frame portion illustrating one of the early steps in the joining of round top and seatstay tubes to a round seat tube and with portions of the joining structure partially cut away.

FIGS. 14 through 17 are side views of a bicycle frame portion similar to that in FIG. 13 but illustrating additional layers of carbon fiber strips for assisting in securing the tube members together as an integrated composite structure.

FIG. 18 is a view similar to FIGS. 13 through 17 but showing the addition of reinforcing carbon fiber fabric members in three corners of the integrated frame joint.

FIG. 18a is a view of a fabric member of the type used in the corners of the structure in FIG. 18.

FIG. 38 is an illustration of a bracket structure used in the frame of FIG. 2 for mounting and guiding derailleur shift levers and their related shift cables.

FIG. 39 illustrates a structure for mounting and locating a front derailleur support bracket on the side of a seat tube having an aero configuration.

FIG. 40 is a representation of a seat post support guide of aero configuration within the top end of an aero seat tube.

DESCRIPTION OF PREFERRED EMBODIMENT

Figure 1:
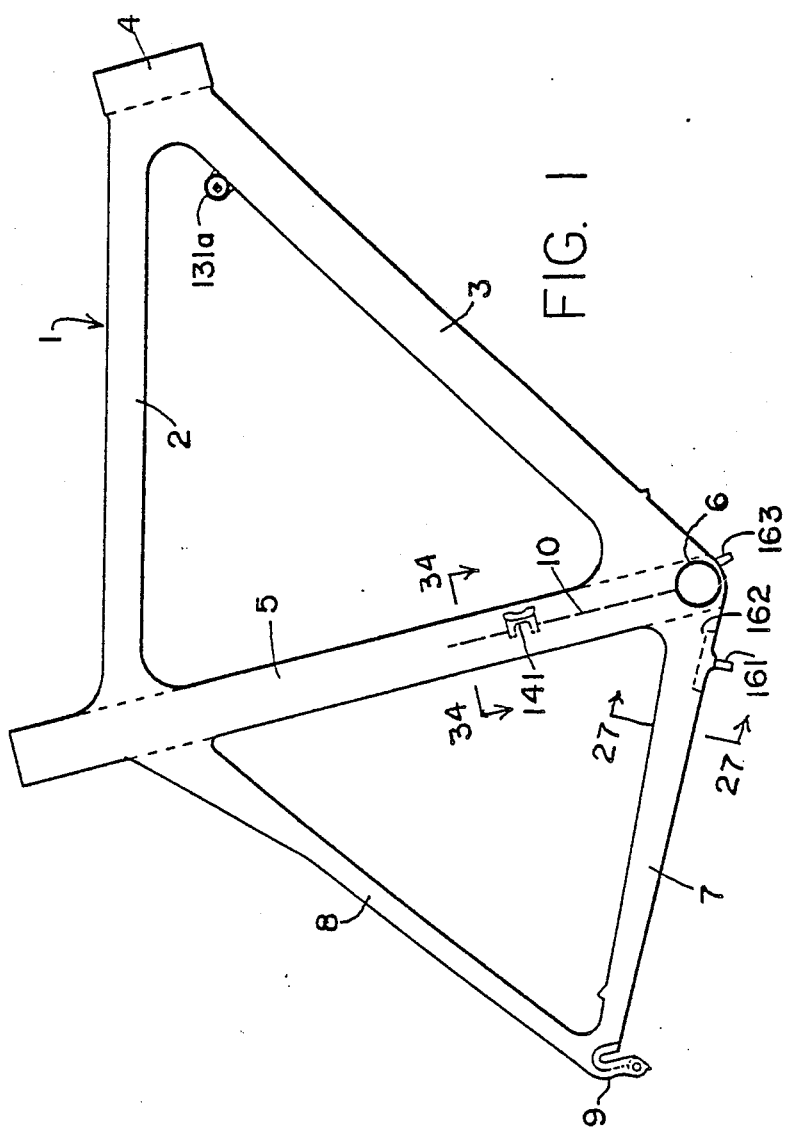
FIG. 1 is a side view of a bicycle frame utilizing primarily round tubular frame members.

The bicycle frame of FIG. 1 illustrates a preferred embodiment of the invention utilizing round composite tubes for the primary structural members. The forward ends of the top tube 2 and the down tube 3 are joined together in a manner described in greater detail hereinafter to the head tube 4. The rear end of the top tube 2 is joined to the upper end of the seat tube 5 and the lower ends of the down tube 3 and seat tube 5 are joined together at the bottom bracket 6. Extending rearwardly from the bottom bracket 6 is a pair of laterally spaced chainstay tube members 7. The rear ends of the chainstay members 7 and seatstay members 8 are connected to respective legs of rear axle dropout members 9. The upper ends of the seatstay members 8 are joined to the seat tube 5 on the side of this tube opposite the junction therewith of the top tube 2.

All of the junctions of the tubular structural members are joined to other portions of the frame structure in accordance with the detailed description set forth hereinafter in connection with other figures of the drawings. The dotted line 10 in FIG. 1 represents a transverse web extending diametrically across the seat tube over essentially the bottom one third of its length to provide added structural strength and rigidity to this portion of the tube. This feature is more clearly defined hereinafter in connection with FIG. 34 of the drawings.

Figure 2:
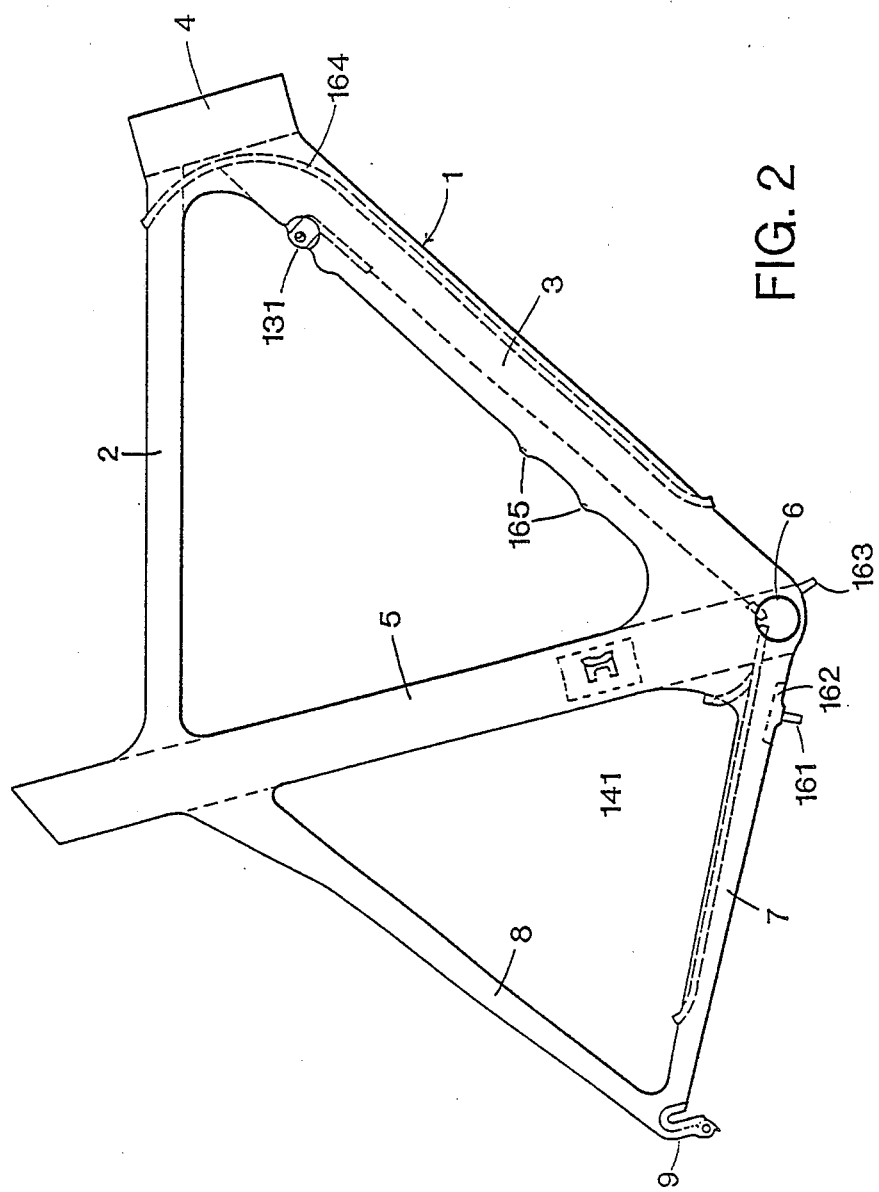
FIG. 2 is a side view of a bicycle frame in which the down tube and the seat tube are aero tube members.
Figure 3A:
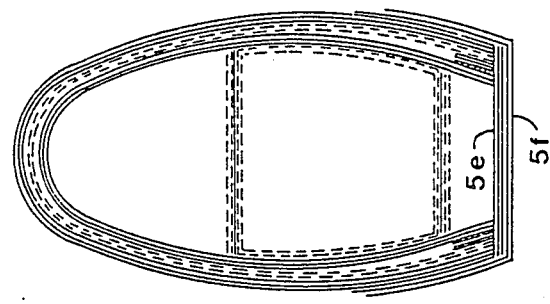
FIG. 3 is a side view of a bicycle frame in which each of the top tube, down tube and seat tube members has an aero tube configuration.
Figure 3:
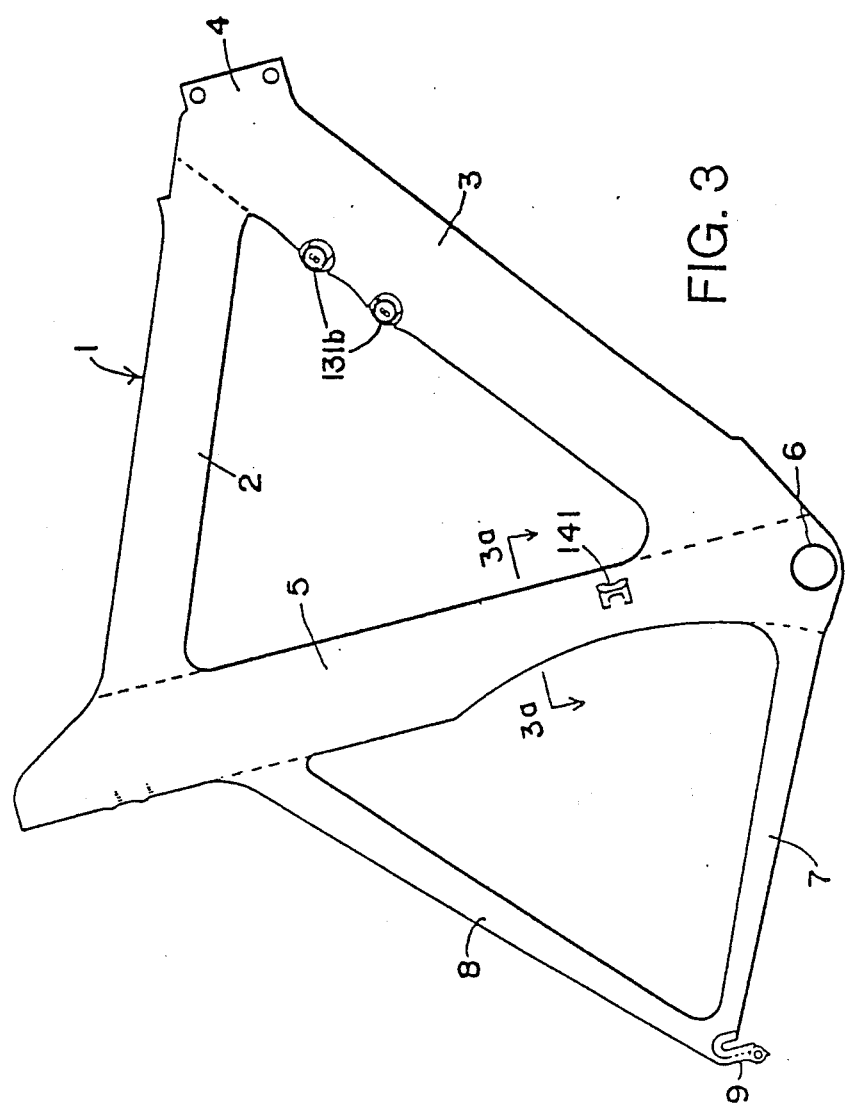

In the alternative embodiments of the frame structure shown in FIGS. 2 and 3, like reference numerals as used in FIG. 1 are used to designate the principal components of the frame. The principal distinctions between the three illustrated frame structures is that in FIG. 1 the top tube 2, down tube 3 and seat tube 5 are all tubular members having a generally circular cross section whereas in FIG. 2 the down tube 3 and the seat tube 5 are members having aero configurations. In FIG. 3 the top tube 2, down tube 3 and seat tube 5 all have aero configurations, the top tube 2 being inclined forwardly and downwardly from the area of the upper end of the seat tube to the junction of the top tube 2 and the down tube 3. Such a downwardly inclined top tube is often used on road bicycles when there is little or no drop in the handlebars of the bicycle and the rider wants to stay in a down position with minimum aerodynamic drag. Suitable dimensions for the main tubes in an all-aero frame are: 2×¾ inches for the top and seat tubes and 2½×1⅛ inches for the down tube.

Figure 4:
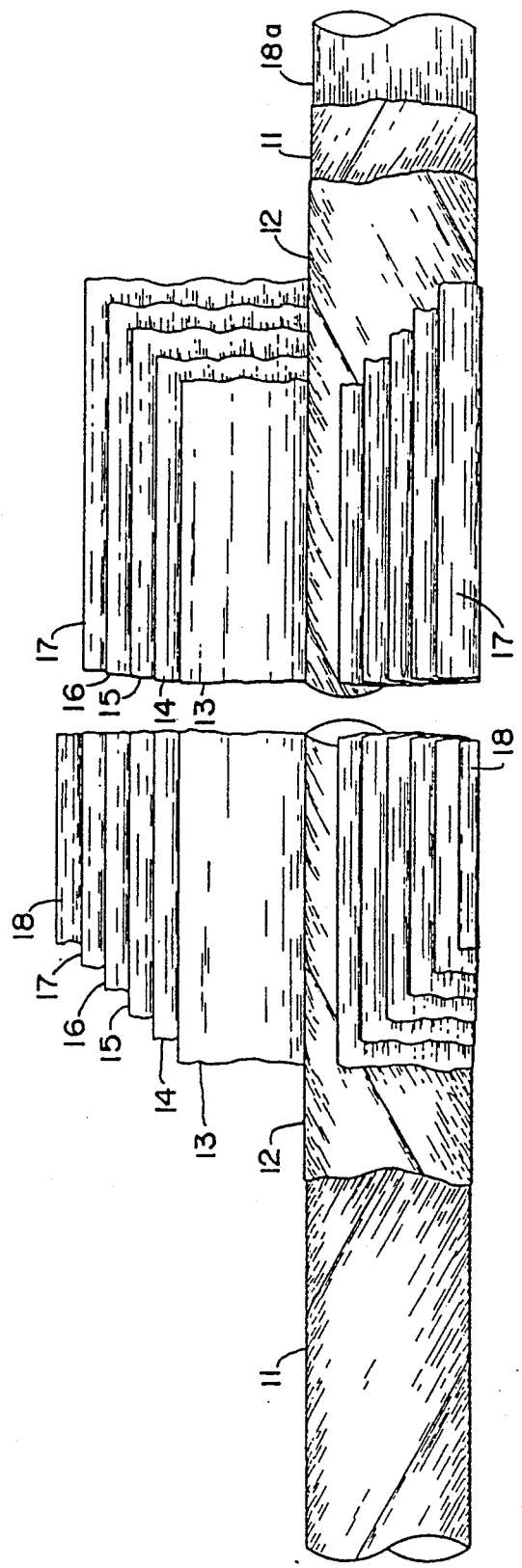
FIG. 4a is an exploded or partially unwrapped view of a portion of a round tube made in accordance with this invention.
FIG. 4b is a view of a tube portion similar to FIG. 4a but with the arrangement of the layers of the composite tube construction differently arranged.

A typical round tube according to the invention for use in FIG. 1 is made on a mandrel having a right circular cylindrical surface. This surface is coated with a hard wax layer having a thickness of about 0.025 to 0.030 inches. The wax stays hard at normal room temperatures and melts at about 250° F. Eight layers of carbon fibers cut from unidirectional carbon fabric are laid up on the waxed mandrel using an epoxy resin. Six of the layers have straight fibers extending essentially in the direction of the tube axis. The fibers of the other two layers are spiralled in opposite directions, respectively, each at an angle of approximately 30° to the tube axis. A convenient way to make the tube as shown in FIG. 4a is to lay up two spiralled layers 11 and 12 first and the add then six straight layers 13 through 18. All layers or strips described here or elsewhere are precut to patterns or prescribed lengths. The total weight of the eight layers is measured and the amount of resin used is in the ratio by weight of 30 parts rein to 70 parts carbon fiber. All eight precut layers are laid up before the resin in any one layer sets up. Before a layer of fibers is added it is thoroughly impregnated with the resin by dabbing it with a resin impregnated brush and then blotting, squeegeeing or rolling the fiber layer to eliminate excess epoxy. After the eight successive layers of epoxywetted fibers are placed on the mandrel the outer surface layer is covered with a layer of peel-ply separating tape which is strong, porous and non-adherent to epoxy. Peel-ply refers to a commercially available fine-weave porous fiberglass or synthetic product treated with a parting agent to which resins such as epoxy will not adhere. Peel-ply is commonly used as a surface bleeder material in laying up composite laminates. This tape is wrapped very tightly around the fiber layers to maintain a pressure of approximately 30 p.s.i. This pressure compacts the fiber layers and causes excess epoxy to penetrate and bleed from the various fiber layers and through the pores of the tape to the outside thereof. The pressure is maintained until the epoxy is completely set. Thereafter the tape may be peeled off taking with it the excess epoxy in its pores and on the outside of the tape. The epoxy has a high tensile strength of about 6000 p.s.i. and a sufficiently low viscosity so that it flows within the multiple layers and bleeds to the outside as described above. It has a pot life or working time of about 30 minutes and sets or cures in about 24 hours at room temperature of 70° F. or in about 4 hours at 250° F. However, since the wax melts at this higher temperature, the curing temperature should be kept low enough to maintain rigidity of the wax until curing of the epoxy is complete. After the peel ply tape is removed the composite tube has a thickness of about 0.080 to 0.090 inches and may be readily removed from the mandrel by raising the temperature of the wax to its softening or melting point whereupon the tubular integrated composite fiber layers can be slid off the mandrel as a unit. Although the wall thickness of this tube is over twice the thickness of common high strength steel bicycle frame tubes, its weight for a given strength is about one third less.

Since the spiralled layers are the innermost layers of the tube they are protected from any abuse as various assembly steps take place which may require smoothing or other operations on the external surface of the tube. As an alternative, the two spiralled layers may be positioned near the middle of the composite layers and they need not necessarily be next to each other. Preferably, in order to keep them protected spiral layer should be either of the two outer layers. The outermost straight layer 18 may be omitted and replaced by straight layer 18a as the first layer at the inside of the tube as shown in FIG. 4b.

Although in the preferred embodiment the spiralled layers have the fibers spiralled in opposite directions at 30° to the tube axis, this angle may vary over a range of about 20° to 40°. This spiralling adds torsional strength to the tube as well as giving it adequate hoop, i.e., the ability to withstand squeezing forces which tend to oval or flatten a round tube.

Figure 34:
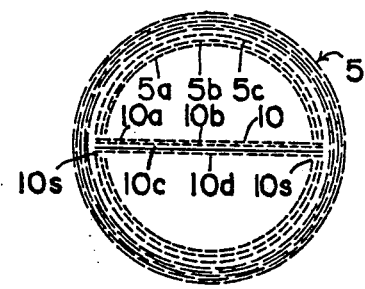
FIG. 34 is a cross section of a round seat tube taken on line 34—34 of FIG. 1.

A round seat tube 5 is made with a slightly different sequence of layup operations. A tube having a transverse reinforcing web 10 along its lower length is made using the same general sequence described above. However, as shown in FIG. 34, the first three layers 5a, 5b and 5c of fiber are applied with fibers extending parallel to the tube axis, the excess epoxy is bled out using tightly wrapped peel ply tape and these three layers are permitted to set. Then these layers are removed from the mandrel, the tape is removed and a transverse slot 10s about 0.025 inches wide is cut through both sides of the tube along a plane containing the tube's axis. The slots thus formed in the two walls each extend about one third the length of the seat tube from the end at the bottom bracket toward the seat end as represented by the dotted line for web in FIG. 1. To strengthen the bottom end of the seat tube the reinforcing flat web strip 10 is made for insertion in the slots with the web extending essentially diametrically across the tube throughout the length of the slots. The web is made from four superimposed layers of carbon fibers imbedded with epoxy and pressed together between two flat glass sheets coated with a material to which the epoxy will not adhere. Referring to FIG. 34 for orientation, the four layers comprise in succession two layers 10a and 10b with the fibers in a first direction, a third layer 10c with fibers extending 90° with respect to the fibers in the first two layers and a fourth layer 10c with fibers parallel to those in the first two layers. After this composite four-layer web is set or cured and the glass plates removed, the web is cut into elongated strips whose lengths are parallel to that first direction, which corresponds to the direction of the seat tube axis. The strips have widths equal to the diameter of the slotted insert portion of the tube or about 1.25 inches wide and lengths equal to the length of the slots. One such strip is secured to the bottom end of the seat tube in its slots and fixed therein by means of epoxy embedded with microballoons to completely fill any voids between the web strip and the edges of the slots. After the web strip 10 is set and the outer surface of the tube is made smooth, if necessary, five additional layers of straight fibers, like layers 13 through 17 of FIG. 4b, are laid up after wetting the tube surface with epoxy. Two of the first three additional layers may be spiralled layers as described before. The additional five layers are wrapped with peel ply tape to eliminate voids and reduce the residual epoxy in the fiber layers. When the seat tube is used in a frame as described hereinafter, the tube will be oriented so that the web strip 10 extends transversely of the frame in a plane generally parallel to or including the axis of the bottom bracket.

For maximum strength of a tube made in accordance with this invention the fibers, whether in a spiralled or a longitudinal configuration, preferably extend throughout the entire length of the tube except where they are cut away for assembly or reinforcing purposes as described herein.

A typical road bicycle frame using this invention may incorporate a top tube made using a 1.0 inch diameter mandrel and the down and seat tubes may be made using 1.125 inch diameter mandrels. Seatstays and chainstays are made with a construction similar to the layup shown in FIG. 4, but a tapered mandrel of smaller diameter is used. Each stay tapers in the direction toward the rear axle dropout. The chainstays are oval in cross section near the bottom bracket and are slightly flattened at their inner faces near the bottom bracket to provide greater clearance between these faces and a tire on the rear wheel (not illustrated) of the bicycle. The height and width of the chainstay mandrel are approximately 1.25 in. and 0.75 in. at the front end tapering to a round cross section of approximately 0.5 in. at the rear end. The height and width of the seatstay mandrel are approximately 0.875 in. and 0.5 in. at the seat end tapering to a round cross section of approximately 0.375 in. at the lower rear end.

The chainstays and seatstays are each laid up on mandrels as previously described and each tapers toward the dropout or rear axle area. The layup of these stays differs slightly from the layup of the tubular structure shown in FIG. 4a. Each stay has two inner layers spiralled in opposite directions at approximately 30 degrees to the axis of the stay and five layers of longitudinally extending fibers overlying the spiralled layers for a total of seven layers in the initial lay up, all of which are laid up simultaneously using peel ply tape as described previously. The rearmost ends of the stays have a cylindrical inner surface over a length of approximately two inches for attachment of arms of the dropouts 9 as will be described in connection with FIGS. 35 through 37. The forward two thirds of the chainstays are covered with crowfoot carbon fiber cloth to provide additional strength and wear resistance. The crowfoot woven carbon fiber cloth weights about 9 ounces per square yard and may be laid up simultaneously with the other seven layers.

Figure 35:
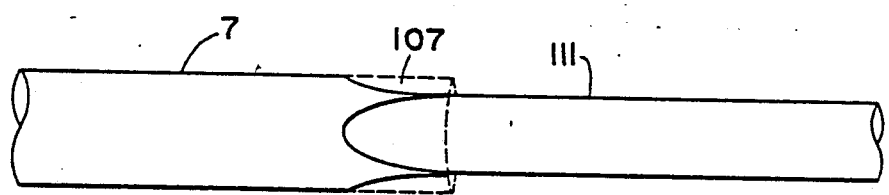
FIGS. 35, 36 and 37 are views illustrating the sequence of joining a tubular frame stay to a rod like portion of a rear axle dropout structure.
Figure 36:
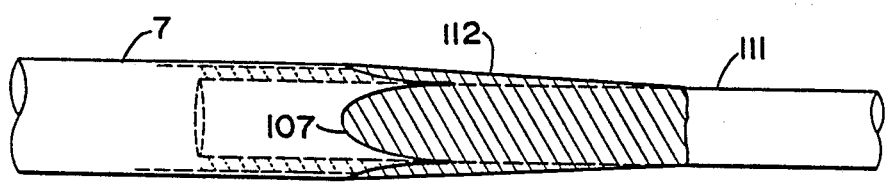
Figure 37:
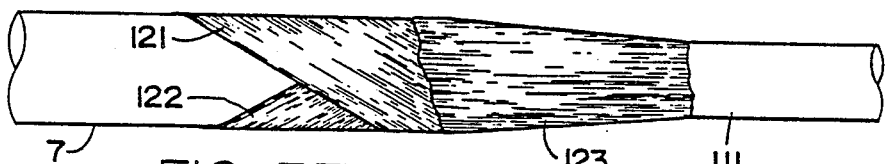

FIGS. 35 through 37 illustrate the sequence of bonding the rear end of the chainstay to one of two rodlike or cylindrical arms 111 which are connected to the dropout 9. The dropouts for the rear axle which are used in this invention are of a shape common to bicycle frame manufacture. Preferably the dropouts are of cast aluminum construction with long cylindrical arms which fit into the ends of the chainstays and seatstays. The arms of any dropout to be used must be long enough to provide sufficient surface area for the adhesion and fiber wrapping process as described in this specification. One suitable dropout is the type used by several bicycle frame manufacturers in constructing aluminum tube frames using an adhesive bonding method. One such manufacturer is the Vitus company of France. Alternatively, high tensile strength plate of an aluminum alloy such as 6061 can be cut to the required shape of each dropout in a plane parallel to the plane of the rear wheel of the bicycle. Some minor bending of the arms toward the centerline of the frame may also be required in order to allow the dropouts to align accurately into the ends of the chainstays and seatstays. In using flat plate the arms of such dropouts are likely to be square or rectangular in cross section but can be readily accommodated in the construction as described. Standard commercially available dropouts intended for use in brazed steel alloy frames are suitable only if they are first fitted with extensions of the two portions of each dropout which are intended to be brazed to the rear ends of the chainstays and seatstays respectively. Such extensions may consist of chrome-moly tubing brazed to the dropout in the manner in which such dropouts would normally be brazed into a frame. Dropouts could also be fashioned from a molded laminate of the same carbon material used to construct the frame tubes of the present invention or of any other composite material of sufficient strength and stiffness.

To attach a dropout to a chainstay, the rear end of the chainstay 7 is scalloped as shown at 107 in FIG. 35 to aid in strengthening the joint and assuring that a filled epoxy bonding material shown at FIG. 112 in FIG. 36 completely fills the space between the dropout arm 111 and the interior cylindrical surface of the chainstay 7. This epoxy resin bonding material is filled with an essentially noncompressible aluminum filled epoxy material and is available under the trade name Devcon Aluminum Putty. The epoxy is also preferably nonshrinkable so that the space between the dropout arm 111 and the chainstay 7 remains filled. After curing of the epoxy the joint is wrapped with two spiral layers 121 and 122 wound in opposite directions at an angle of approximately 30 degrees to the axis to the chainstay. These spiral layers each completely surround the scalloped area 107 of the chainstay and are covered with a plurality of superimposed layers 123 having fibers extending longitudinally of the chainstay.

Each of the dropout is secured to the chainstay as just described before the chainstay is assembled with the seatstay. After the chainstays are attached at both sides to the bottom bracket at least to the extent described in connection with FIGS. 19 and 27 of the drawings, the axle of a trued wheel or an alignment jig is mounted in the dropouts to check the position of the stays. The seatstays are then slipped over the other arms of the dropouts and their upper ends are cut and fit with precise miter joints to the seat tube. After the chainstays end seatstays are properly oriented for precise wheel mounting, the ends of the seatstays are bonded to the other arms of the dropouts and to the seat tube. The bonding at the dropout end of the seatstay corresponds to that described in connection with FIGS. 35 and 36 and this bonded joint is subsequently covered with layers of unidirectional carbon fiber fabric as described in connection with FIG. 37.

The layers of carbon fabric laid up as shown in FIG. 37 preferably extend forward to the rearward end of the crowfoot woven carbon fiber material covering the forward two thirds of the chainstays. All of the laying up of the fiber strips as shown and described in connection with FIG. 37 occurs while they are all wetted with epoxy and they are secured with peel ply tape as previously described until these layers are cured.

FIG. 38 illustrates a bracket 131 for mounting derailleur shift levers in the down tube 5 of the bicycle frame in FIG. 2. This bracket includes a front pedestal 132 for mounting the front derailleur shift lever and a rear pedestal 133 for mounting the rear derailleur shift lever. These pedestals 132 and 133 are firmly secured as by brazing to a metal base plate. The down tube is cut open to permit insertion of the bracket 131. The base plate is secured by screws 136 for an initial mounting on the top surface of the spar 96 which is located centrally of the interior of the down tube. The down tube has openings as seen in FIG. 2 to provide access to the pedestal structures for manipulating shift levers to be mounted thereon. After the shift lever bracket is mounted in the down tube first by screwing it to the spar and then by securing it with carbon fiber strips or fabric overlying portions of the base plate and the surface of the spar, the area around the shift lever pedestals is rebuilt for strength and appearance purposes. As seen in FIGS. 2 and 38 the shift lever pedestals are mounted in tandem and the shift levers are mounted thereon in conventional manner from opposite sides. Cables from the shift levers pass downwardly from the forward portion of each of the pedestals and enter tubes 134 and 135 for the front derailleur shift cable and the rear derailleur shift cable, respectively. These tubes have a smooth bend just beneath their respective pedestals and their forward ends are opened upwardly to receive the cables. The main portion of the tubes are brazed to and extend a short distance along the top surface of the bottom plate of the shift lever bracket 131. The tubes open rearwardly to allow the shift cables to pass therefrom downwardly and rearwardly within the down tube 3 as indicated by a broken line in FIG. 2. A similar derailleur lever mounting bracket is used in FIG. 3, but the shift levers are mounted from the same side by means of the structure shown at 131b in FIG. 3. Instead of the tandem arrangement of shift lever pedestals as shown in FIG. 2 and 3, the round down tube 3 of FIG. 1 has secured to its top surface a shift lever mounting bracket in which the lever mounting points are side by side as indicated at 131a in FIG. 1.

In each of FIGS. 1 through 3 a metal front derailleur mounting bracket 141 is shown located on the side of the seat tube a short distance above the bottom bracket. The derailleur structure would be mounted on this bracket in a manner well known in the art. However, the location of the derailleur bracket may be at different distances from the center line of the seat tube depending upon the dimensions of the seat tube and the width of the bottom bracket and upon the various components to be installed on the bicycle frame in connection with the crank assembly. To support the front derailleur 141 at a greater distance from the surface of the seat tube a structure may be used as shown in FIG. 39. This structure comprises a semi-cylindrical metal member 142 to which the derailleur bracket 141 is brazed. The vertically extending edges of the semi-cylinder 142 are in turn brazed to an arcuately shaped plate 143 conforming to the exterior surface of the aero shaped seat tube 5. The metal plate 43 is bonded to the exterior of the aero tube 5 and the edges of this plate 43 and portions of the cylinder 142 are covered with a bonding carbon fiber fabric to further strengthen the attachment to the seat tube and to smooth out the external surfaces of this structure. Both of the members 142 and 143 may be substantially perforated to reduce their weight.

In addition to the main structural members made of metal as indicated at the head tube 4, the bottom bracket 6 and the dropouts 9, the only other main structural member of the frame is a seat post guide made of metal and firmly secured within the upper end of the seat tube 5. FIG. 40 illustrates such a seat post guide 151 of aero configuration within the upper end of an aero shaped seat tube. A seat post (not illustrated) fitting into this guide is adjustably secured therein by means of socket head or set screws which may be accessed through apertures 153 at the rear edge of the aero seat tube and which are tightened in threaded sockets 152 against the seat post. A round seat post guide may be similarly mounted. Before bonding a seat post guide within the top end of the seat tube the latter is sanded and chemically cleaned so as to provide a smooth clean inner surface which assures a strong bond when a relatively noncompressible filled epoxy bonding material is inserted between the inner surface of the seat tube and the guide 151.

Since carbon fibers are electrically conductive, any metal members in the frame should be electrically insulated from the carbon to avoid any eventual deleterious effects in the frame due to electromotive action. To provide such insulation, aluminum or steel members may be coated with a film or layer of insulating epoxy resin. This may be part of the bonding resins used herein. Aluminum members may be insulated by having their surfaces anodized.

As seen in FIGS. 1 and 2 each of the chainstays has a rear brake post 161 mounted on its underside a short distance rearwardly of the bottom bracket. These metal posts are firmly attached to the underside of the chainstays by means of metal brackets 162 to which they are brazed and which are in turn imbedded within the structure of the chainstays. The mounting plates 162 are shaped to conform to the undersurface of the chainstays and in addition to being bonded thereto are overlaid with resin- impregnated carbon fiber fabric which provides strength and smoothness around the base of the brake posts 161. Projecting downwardly from the area of the bottom bracket 6 just ahead of the bottom bracket is a brake cable guide 163 which aids in guiding the brake cable from a brake cable tube 164 around the bottom bracket and to the brake structure to be mounted on the brake post 161. The brake cable tube 164 extends along substantially the entire length of the down tube, exiting the latter a short distance forward of the bottom bracket 6 and the brake cable guide 163. As seen in FIG. 2 this brake cable tube extends along the bottom of the aero tube structure to the vicinity of the head tube where it bends upwardly, passing through the spar and upper tube wall at the forward end of the down tube and upwardly adjacent to the head tube and thence further up into the top tube 2, exiting the latter a short distance behind the head tube and providing an opening at this exit to receive a brake cable from a brake actuating mechanism found on the handle bars of the bicycle. Near the head tube 4, the brake tube is imbedded in the filler which supports the various carbon fiber strips thereat. Where the tube 164 extends through the spar and walls in the down tube, they may be rebuilt around the tube 164 to preserve its integrity of the tubes before the top tube and the down tubes with the tube 164 therein are bonded to the head tube.

On the top surface of the aero shaped down tube of FIG. 2 and a short distance forward of the seat tube 5 are two imbedded internally threaded members 165 for mounting a water bottle cage in a conventional manner. These threaded members are firmly bonded to the down tube 3 so as to become an integral part thereof and not to interfere with the structural integrity of this tube.

Figure 30:
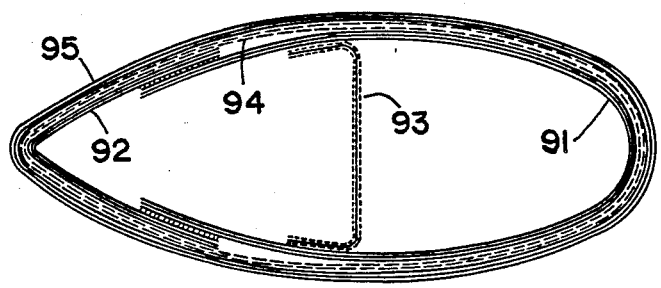
FIG. 30 is a view similar to FIG. 29 but illustrating the addition of a plurality of additional layers of carbon fiber structures to form an integrated composite aero tube member.
Figure 31:
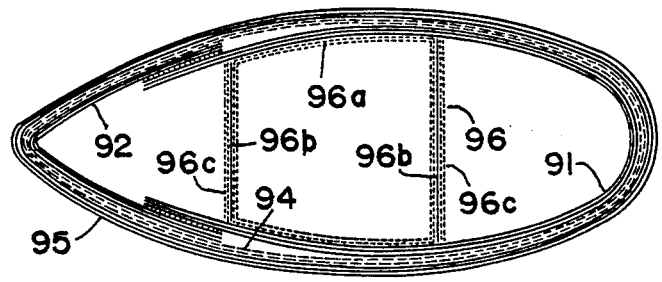
FIG. 31 is a section of an aero tubed member similar to that shown in FIG. 30 but with an internal reinforcing spar replacing the web of FIG. 30.
Figure 32:
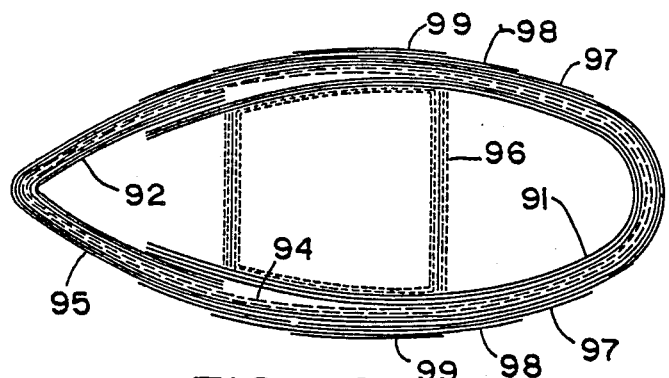
FIG. 32 is a sectional similar to FIG. 31 but illustrating the addition of three layers of carbon fiber reinforcing strips of different widths located lengthwise of the tube on each side of the aero tube structure.

In FIG. 3 the bicycle frame has an aero seat tube 5 which may have a cross section as shown for example in FIGS. 30, 31 or 32. This seat tube as shown in FIG. 3 has generally parallel straight leading and trailing edge portions between the bottom bracket and the junction of the seat tube with the top tube. However, the lower portion of the trailing edge has been cut away in an arc, concentric with the axle location in the dropout 9, over an angle of at least 45 degrees, preferably about 55 degrees. This cut out portion has a uniform radius of curvature centered at the axle location and the rear surface of the seat tube at the cut out area is essentially cylindrical. As seen in FIG. 3a the rear surface at this cut out area is a flat surface. The front to rear dimension of the seat tube is about one third narrower along a line from the axis of the rear axle perpendicular to the leading edge than is the distance between the straight leading and trailing edge portions. When this portion of the seat tube is cut away there remain two spaced edges which are closed as shown in FIG. 3a by first bonding thereto a thin, generally flat preformed and slightly flexible spanning web made of three layers 5e of unidirectional carbon fibers, the fibers extending generally parallel to the seat tube. This thin carbon fiber layer is then covered with three layers 5f having fibers extending generally parallel to the seat tube. These fibers are laid up over the preformed web and overlie the sides of the seat tube along the cut out area. The seat tube member interconnects a seat post socket and a bottom bracket member and a line from the center of the seat post socket to the center of the bottom bracket member is forward of the arcuate trailing edge of the seat tube member. The arcuate cutout at the lower rear side of the seat tube allows the rear axle dropout to be located nearer to the bottom bracket without interference between the rear bicycle wheel and the trailing side of the aero seat tube 5. This is particularly helpful when the seat tube has a large front to rear dimension, i.e., where this dimension is 3⅜ inches, the distance from the leading edge to the cylindrical cutout may be 25/16 inches.

Figure 5:
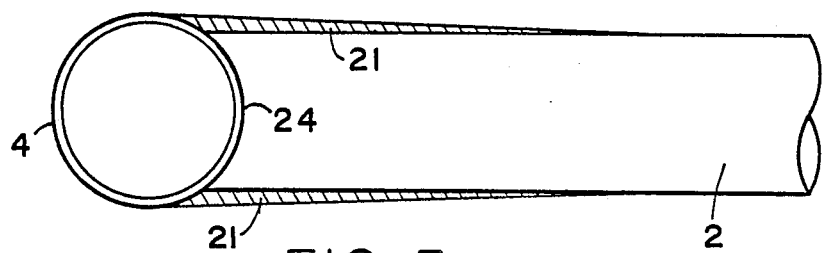
FIG. 5 is a partial view of the junction of two tubes of different diameters.

One of the significant features of the invention is illustrated in FIG. 5 of the drawings where the top tube 2, made on a one inch mandrel, is shown joined to the head tube 4, having a 1¼ inch diameter. The top tube 2 is of smaller diameter than the head tube 4. In order for carbon fiber strips which are to be bonded to both the top tube 2 and the head tube 4 to be able to assume configurations where they remain in tension when stresses are applied between the tubes, filler material 21 is bonded to the tubes so that carbon fiber strips passing from the surface of the top tube may pass therefrom in a direct line to points of tangency with the periphery of the head tube. Without the filler 21 the carbon strips would follow the periphery of the tubes 2 and 4 and would be indented or externally concave at the point where the tubes join.

Figure 6:
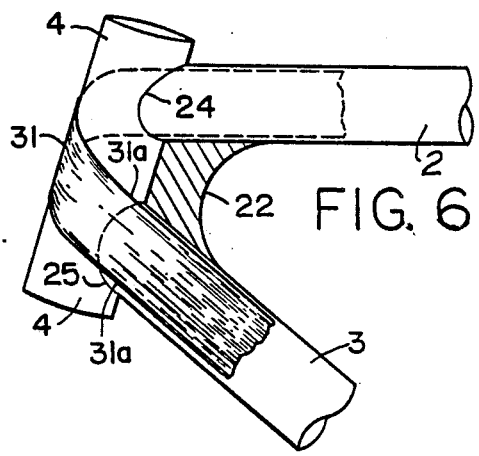
FIG. 6 is a partially cut away view of a portion of a bicycle frame illustrating the joining of a round top tube, a round down tube and a round head tube.
Figure 7:
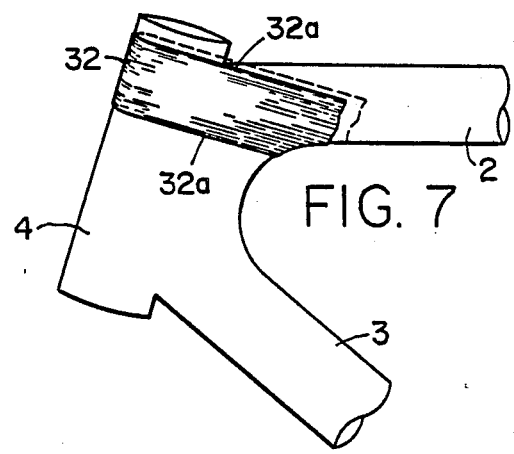
FIGS. 7 through 11 are side similar to FIG. 6 but illustrating the application of different layers of carbon fiber strips which assist in the securing of the tubes in an integrated composite structure.
Figure 8:
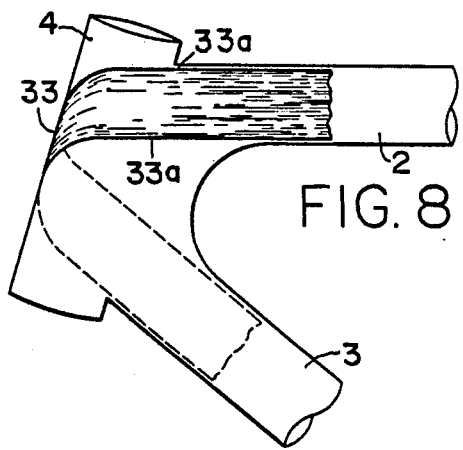

As seen in FIGS. 5 and 6 the head tube 2 and the down tube 3 are fish-mouthed for joining the head tube 4 at lines 24 and 25 where their surfaces intersect the exterior surface of the head tube 4. When any fish-mouthed tube is initially bonded to a solid surface of another tube during assembly, a quantity of the bonding epoxy may be first inserted into the fish-mouthed tube and the tubes oriented after placing them together to allow the epoxy to run down onto the surface of the other tube and allowed to set there, thus forming a small plug in the fishmouth to give added strength and a greater bonding area at the joint. In FIG. 6 additional filler material 22 is shown partially cut away in the area between the top tube 2 and the down tube 3 adjacent to the head tube 4. The need for filler at the junction of the three tubes illustrated in FIG. 6 through 12 will become more apparent from the following description of the application of several different carbon fiber strips as shown in this series of drawings. In FIG. 6 the strip 31 of carbon fibers is shown having one end bonded to the down tube 3 and extending forwardly therefrom over an area of filler to a point of tangency with the head tube 4 and therearound to the other side of the head tube and thence over another area of filler to an area on the far side of the top tube 2 to where it is bonded to the latter. Throughout the entire length of the layup of the carbon strip 31 all outer surfaces of the strip are either straight or outwardly convex. With such a configuration all tension stresses in the fibers either apply stresses to the bonding epoxy material either along the length of the fibers or inwardly transversely of the fibers toward the supporting surfaces for the fiber strips. For example, the portion of strip 31 which is bent around the front portion of the head tube will exert stresses generally radially inwardly of the head tube 4. With such an arrangement, here, and in all other layups of fiber strips at tube joints, there is a minimum application of stresses tending to delaminate or allow the various carbon fiber elements to pull or be pulled outwardly away from the integrated head tube structure.

The strip 31 is preferably laid up as three layers or superimposed strips of carbon fibers of similar lengths but with their ends staggered at each end of the strip 31 so that there is a gradual tapering of the thickness of the ends of strip 31 as it extends outwardly from the head tube 4 along the top tube 2 and the down tube 3. The lengths of the strip 31 along the top and down tubes as well as the lengths of any other strips extending along frame tubes must be sufficient to give a good bond strength between the strip and these tubes. The filler material supports the edges of the strip 31 at the points 31a as shown in FIG. 6 so that these edges do not pull in toward the line 31 at the junction between the down tube 3 and the head tube 4 either during manufacture or use. All other strips described in the specification for lay up at the tube joints are preferably made of three layers as described above for strip 31.

In FIGS. 7 through 11 there are illustrated additional carbon fiber strips which are superimposed one upon another. Each additional strip overlies portions of filler material with a resulting laid up composite structure generally like that illustrated in FIG. 12. In all cases where the strips 32 through 36 extend over a joint between the tubes the filler material beneath these strips evens the surface and supports the strips at the otherwise indented points indicated at 32a through 36a so that at all times the outer surface of the strip is either flat, straight or outwardly convex.

Figure 12:
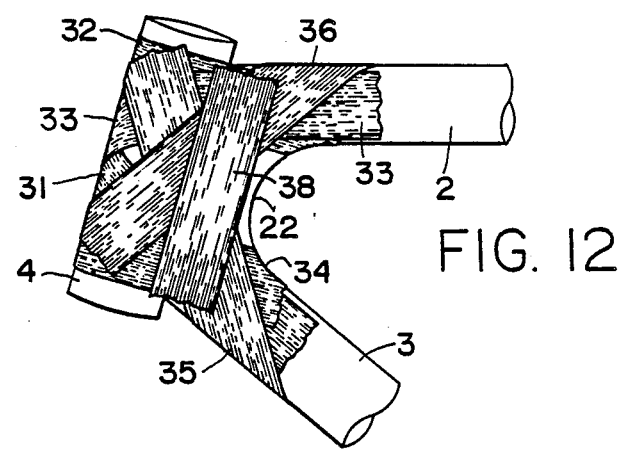
FIG. 12 is a view similar to FIGS. 7 through 11, but illustrating the relative orientation of plurality of superimposed carbon fiber strips which are bonded together to form an intergraded composite structure.

The strips 31, 33, 35 and 36 in FIGS. 6, 8, 10 and 11 are asymmetrical with respect to the head tube structure and it is to be understood that mirror images of these strips are also to be wrapped around the head tube structure. For example, the mirror image of the strip 31 would be wrapped from the rear side of the down tube 3 in FIG. 6 around the front of the head tube 4 and out onto the near side of the top tube 2 in this FIG. 6. As seen in FIG. 12 an additional strip 38 is wrapped over the outer surfaces of the several other carbon fiber strips and around the ends of the top tube 2 and the down tube 3 just rearwardly of the head tube 4. This strip 38 is only partially shown in FIG. 12 and actually encircles the entire head tube joint structure just to the rear of the head tube. If desired, a further cross woven bias-cut fabric of carbon fibers may be cut and shaped to cover essentially all of the laid up carbon fiber strips at the head tube structure. This is particularly helpful in not only providing some additional strength but also in providing a better external surface for finishing the exterior of the bicycle frame. All of the laid up layers of strips and fabric at the head tube joints are preferably applied before any epoxy in these layers has set. These layers are tightly wrapped with vinyl tape to squeeze out excess epoxy and eliminate voids in the bonded layers.

In FIG. 13 there are illustrated a round top tube 2, a round seat tube 5 and generally round seatstays 8 which are fish-mouthed or mitered so that the ends of the top tube 2 and the seatstays 8 may be precisely fit against the wall of the seat tube 5 at the junction lines 41 and 42. These tubes 2, 8 and 5 are temporarily secured in fixed position by an epoxy adhesive at the junction lines in preparation for the addition of filler material covering most of the area around the junction lines to enable a multiplicity of carbon fiber strips to be superimposed over this joint area and supported by the filler to strongly and rigidly interconnect the three tube members as will be seen in the description following with regard to FIGS. 13 through 18. The filler material has been partially cut away in FIG. 13 to expose the details of the junctions of the tubes, but is generally indicated by the remaining filler portions 43 through 46.

In FIG. 13 the carbon fiber strip 51 is shown extending from one side of the top tube 2, over a portion of the filler material generally at the area 51a and around the back side of the seat tube and then again over additional filler material at the rear side corresponding to the area 51a on the front and then along the top tube 2. The ends of this strip are securely bonded to the top tube 2 and the support by the filler material at the areas indicated by 51a allows the strip 51 to remain throughout its length either straight or outwardly convex so that there are no indentations or recesses in its outer surface which would allow the fibers to be stressed in a manner tending to pull them away from the joint structure when the fibers are placed in tension during use of the bicycle frame.

In each of FIGS. 14 through 17 there is illustration of the use of an additional strip of carbon fibers to interconnect two of the frame tubes to aid in securing a completely integrated composite structure of resin-impregnated carbon fiber materials constituting the frame joint structure. Mirror images of any asymmetrical strips are added on the opposite side of the frame. The strip 52 interconnects the junction area of the top tube 2 and the seat tube 5 with the seatstay tube member 8. The carbon fiber strip 53 interconnects the top tube 2 with the seat tube 5. The carbon fiber strip 54 overlies the seat tube 5 and interconnects the top tube 2 with the seatstay 8. The carbon fiber strip 55 overlies the seat tube 5 and its ends may be wrapped around both the top tube 2 and the seatstay 8. For each of the carbon fiber strips 51 through 55 in FIGS. 13 through 17 there are intermediate edge portions of these strips indicated at 51a through 55a which are supported by filler material to prevent any concavities in the exterior surface of the fiber strips where, except for the support of the filler material, the strips would tend to sink or be depressed or not be permitted to have smooth bends in the areas of the junctions of the frame tubes.

After the plurality of carbon fiber strips are laid up on the joint comprising the top tube 2, the seat tube 5 and the seatstays 8 the crotches of the joint may be further reinforced by the application of woven carbon fiber fabric pieces 57 which are cut on the bias to permit them to be readily shaped over the crotch areas. A larger carbon fiber fabric piece also cut on the bias may be used to overlie the larger more obtuse angled crotch at the rear of the joint structure. A bias cut fabric member is illustrated in FIG. 18a.

Figure 25:
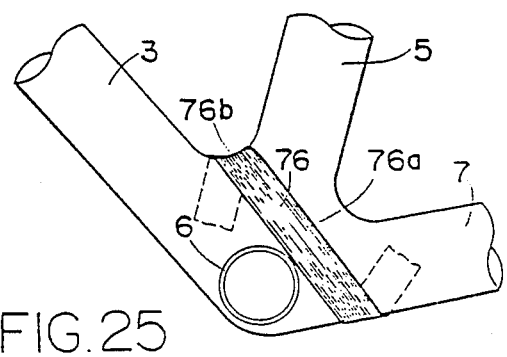
Figure 26:
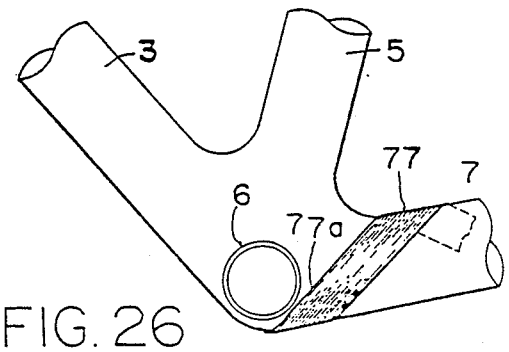
Figure 27:
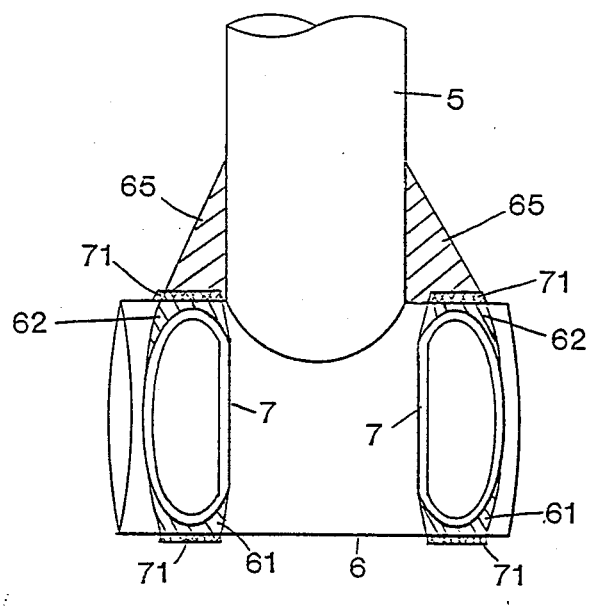
FIG. 27 is a section of a bottom bracket portion of a bicycle frame taken on line 27-27 of FIG. 1 with portions of the structure partially cut away or omitted.

The most difficult joint to construct and the joint most subject to stress during vigorous pedaling of a bicycle is the joint at the bottom bracket to which the detailed illustrations of FIGS. 19 through 27 and 41 relate. The complexity of construction and of resisting the stresses applied to the bicycle frame at the bottom bracket is due to not only the greater number of tubular members which need to be joined to each other but also the orientation of these parts to provide space between the chainstays 7 for the bicycle wheel and to provide the horizontal axis through the center of the bottom bracket 6 for the bicycle crank. In FIG. 27 the inner sides of the chainstays 7 are flattened to provide additional space for the bicycle wheel which rotates there between. Forces applied to the crank will result in forces to the frame which vary greatly and continuously both in magnitude and direction particularly when the bicycle rider is out of the saddle and applying maximum force to the pedals while he is at the same time subjecting the bicycle frame to a variety of contortions due to both his weight and the forces he also is applying to the frame at the head tube through the handle bars. Other road forces, of course, are applied to the head tube via the front fork (not illustrated) and from the rear wheel through the chainstays 7 and the seatstays 8.

In assembling a frame, the top tube and the down tube are both rigidly bonded to the seat tube before being connected to the head tube. The ends of the top and down tubes are then carefully fitted to the head tube so that its assembled position will be precisely as desired. For example the seat tube may be assembled at an angle of 75 degrees and then the head tube may be adde at an angle of 74 degrees, both angles being with respect to the horizontal when the bicycle is finally assembled.

The first step in building up the integrated composite resin-impregnated carbon fiber structure around the bottom bracket 6, having a diameter of 1⅜ inches, is to preliminarily join the down tube 3, the seat tube 5 and the chainstays 7 to the tubular metal bottom bracket to hold these parts in fixed positions while the composite structure is constructed therearound. The ends of the tubes 3, 5 and 7 are precisely fitted to the exterior cylindrical surface of the bottom bracket 6 and to each other where necessary, and initially secured to each other by bonds to hold the tubes in fixed relationship while the joint structure is built up.

Figure 19:
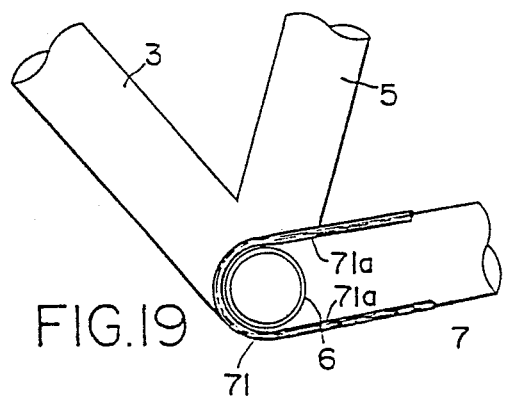
FIG. 19 is an illustration of a portion of a bicycle frame structure showing an early step of a sequence in which round down and seat tubes are joined to a cylindrical bottom bracket along with tubular chainstay members.

The initial application of filler material at the bottom bracket joint consists of building up the upper and lower surfaces of the chainstays 7 as seen most clearly in FIG. 27 at points 61 and 62 so that the carbon fiber strips 71 may extend from their bonded positions on the chainstay over portions of the filler material 61 and 62 to meet the outer surface of the bottom bracket essentially tangentially at the top and bottom of this bracket and continue forwardly around the bottom bracket in engagement with the surface thereof and continue, leaving the surface tangentially and passing over the filler material, to where its other end is bonded directly with the opposite side of the chainstay. As seen in FIG. 19 the areas of the carbon fiber strips 71 at the point 71a are supported by the filler material so that these portions of the carbon fiber strips 71 do not dip and cause any indentation in the outer surface of the carbon fiber strip.

Figure 20:
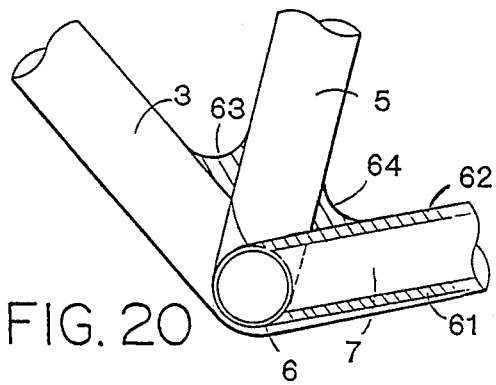
FIG. 20 is a view similar to FIG. 19 with a portion of the structure partially cut away.

FIG. 20 not only illustrates some of the lines along which the tubes join at the bottom bracket structure, but also it illustrates further the application of additional filler material 61, 62, 63 and 64 which is shown partially cut away. This is representative of the filler material placed around the bottom bracket joint for the most advantageous application of additional structural carbon fiber strips as represented by the strips 72 through 78 in FIGS. 21 through 26 and 41. As seen more clearly in FIG. 27 portions of the filler material at 65 are placed over the carbon fiber strips 27 to optimize the placement and support of other strips just above the bottom bracket and on opposite sides of the seat tube 5 as shown in FIGS. 21, 23, 24 and 25. This filler material provides strong support for the carbon fiber strips where they pass over areas which would otherwise provide substantial indentations or irregularities at the junctions of the various tubes.

As shown in FIGS. 21 through 26 each of the tubes 3, 5 and 7 is connected to the other two tubes of this group by at least one carbon fiber strip. For example, the down tube 3 is connected to both the seat tube 5 and the chainstay 7 by the strips 75 and 72 in FIGS. 24 and 21, respectively. Of course, mirror images of the asymmetrical construction shown in FIGS. 19 through 26 and 41 occur on the opposite side of the bicycle frame. Although carbon fiber strips 72 through 77 are illustrated in FIGS. 21 through 26, they are representative of additional strips that are to be laid up at this joint around the various tubes and over the filler material. It is preferable that each of the tubes 3, 5 and 7 in FIGS. 21 through 26 has extending therefrom a pair of crossed carbon fiber strips bonded to the respective tube and passing therefrom at an angle of less than 45 degrees with respect to the axis of the tube with the other ends of the strips passing on opposite sides of the bottom bracket 6 as is depicted by the two strips 74 and 75 which start from the seat tube 5. These strips spiral in opposite directions from the seat tube and pass on opposite sides of the bottom bracket 6. The location of the lower ends of these strips depends upon the angle to which they are attached to the seat tube and the position at which they are attached to the seat tube. It is also preferable that the bottom bracket structure include carbon fiber strips passing from each of the tubes 3, 5 and 7 underneath the bottom bracket in the manner of the strips 73, 77 and 78 in FIGS. 22, 26 and 41. By such construction; the integrated structure of the bottom bracket with the down tube 3, the seat tube 5 and the chainstays 7 and the superpositioned filler and plurality of carbon fiber strips achieves a joint structure of great strength and rigidity.

Figure 41:
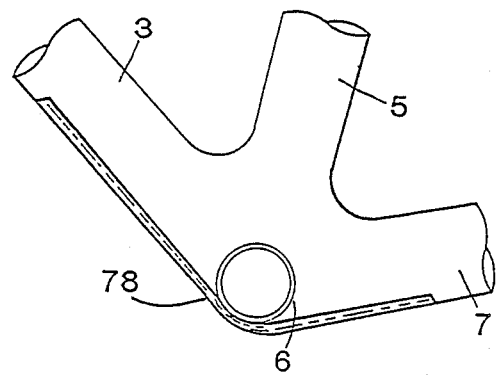

Although the strips 72 through 77 illustrated in FIGS. 21 through 26 are generally spiraled with respect to at least one of the tube members additional strips having ends more nearly parallel to the axes of these tubes may also be intermixed with the strips which are illustrated. For example, strips having first ends attached to the seat tube 5 and generally parallel therewith may pass downwardly on opposite sides of the bottom bracket and therearound with their other ends connected to the down tube 3 and the chainstay 7 respectively, the latter ends being generally parallel to these latter tube members. Similarly carbon fiber strips secured to the down tube 3 and generally parallel therewith may pass downwardly and rearwardly on opposite sides of the bottom bracket and thence to the chainstays 7. One such strip is shown in FIG. 41. In all cases these various strips pass over filler material where necessary in the area of the bottom bracket to prevent any indentations in the exterior surface of the carbon fiber strips for the same reasons given elsewhere in describing the preservation of the integrity of the laminate structure of carbon fiber strips.

Figure 21:
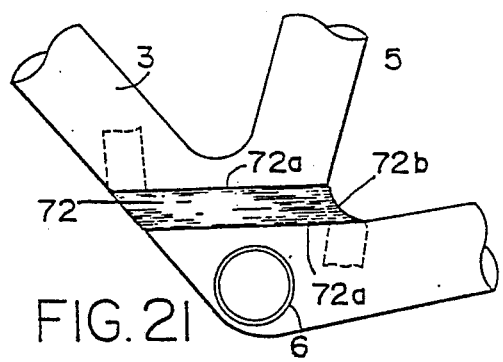
FIGS. 21 through 26 are views similar to FIG. 19 but illustrating arrangements of additional carbon fiber strips at various portions of this bicycle frame joint for assisting in securing the tube members together as an integrated composite structure.
Figure 22:
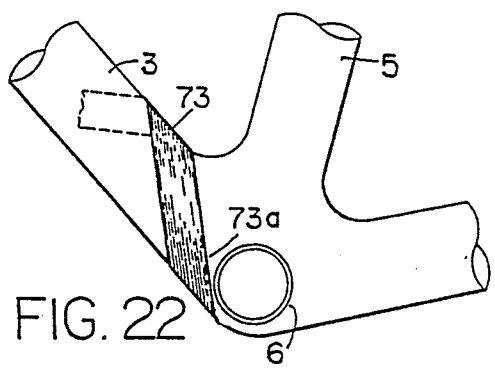
Figure 23:
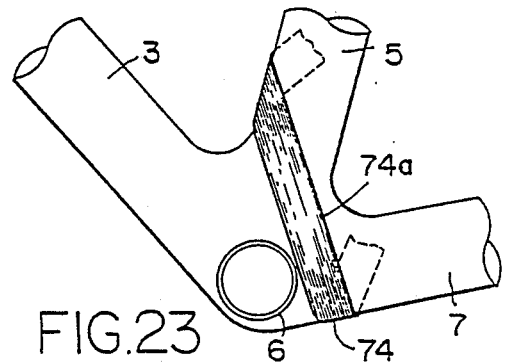
Figure 24:
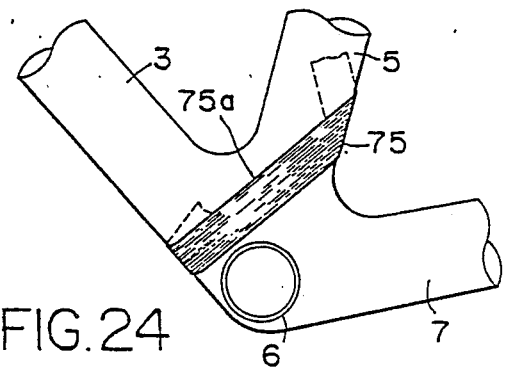

In FIGS. 21 through 26 the strips 72 through 77 each have an intermediate portion represented at 72a through 77a which is directly supported by filler material at points where the strip would otherwise overlie an indentation or surface irregularity at the bottom bracket frame structure. This optimizes the laying up of the carbon fiber strips without any tendency for them to delaminate where they would otherwise tend to pull away from the frame structure wherever they were indented at the exterior of the strip. Also, as seen in FIGS. 21 and 25 the strips 72 and 76 are supported by filler material in the crotches of the joint construction at 72b and 76b so that as the strips are bent around through these crotches the carbon fibers are not squeezed together in a crotch having an extremely acute angle and thus the carbon fibers remained more distributed over the surface of the joint structure. With such construction the maximum strength of the fibers is utilized without concentrating the forces in the crotch as would happen if the fibers were squeezed together rather than laying over a broader surface. In FIGS. 22 and 26 the ends of the strips 73 and 77 which extend under the bottom bracket are not further depicted. The lower end of strip 73 may, depending upon the orientation of the strip as it passes underneath the bottom bracket have an extension corresponding to the mirror image of strip 77 on the chainstay 7 on the other side of the frame. However, this strip 73 might also pass beneath the bottom bracket and then to the inside or outside of the opposite chainstay and up on the other side of the frame to the seat tube 5. Similarly, the other end of the strip 77 may pass beneath the bottom bracket and up on the other side of the frame to either the down tube 3 or the seat tube 5 depending upon the orientation of the strip 77 as it passes underneath the bottom bracket.

Figure 28:
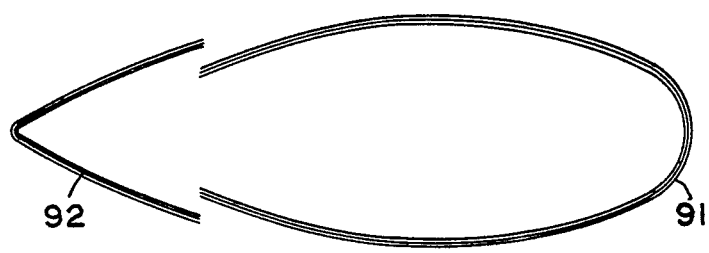
FIG. 28 is a section of two composite laminations which form part of an aero tube assembly before these parts are joined together.

The construction of a tube with aero configuration will be described with reference to FIGS. 28 through 30. The ratio in an aero seat tube of the distance between the leading and trailing edges to the maximum thickness of the tube, at a point about halfway between those edges, is preferably about 3 to 1 to provide a low Reynolds number and optimum aerodynamic characteristics at a speed of 30 miles per hour. A mandrel having an aero-shaped cross section and of sufficient length to make an aero tube is draped with a thin film of plastic sheet material to which epoxy will not adhere. The film is draped over the front or leading curved face of the mandrel and extends over essentially the entire mandrel surface. Symmetrically laid up along the front portion of the mandrel are three carbon fiber layers having the leading edge configuration as at 91 in FIG. 28. These layers of unidirectional carbon fiber fabric have the fibers extending generally parallel to the mandrel or perpendicular to the drawing as seen in FIG. 28. The layers 91 are thoroughly wetted with epoxy, placed on the plastic coated mandrel and bound tightly with peel ply separating tape to compress them and reduce the voids in the fiber layers as well as minimizing the amount of epoxy remaining therein by allowing it to be squeezed out or to bleed through the pores of the peel ply plastic fiber tape. The tape tightly binds these fibers with a pressure of about 30 psi. After the fibers and their epoxy binder are set, the peel ply tape is removed and the structure comprising the layers 91 is removed from the mandrel.

A similar operation as just described for making the intermediate leading edge assembly 91 is also carried out for making the intermediate trailing edge assembly 92 as follows. A plastic film is placed on the trailing edge of the aero shaped mandrel and three layers of carbon fiber fabric to make the intermediate assembly 92 are laid up symmetrically on the trailing edge of the mandrel with the fibers again extending parallel to the axes of the mandrel. These fibers are bound with peel ply tape and when set the peel ply tape and the intermediate assembly 92 are removed from the mandrel.

Figure 9:
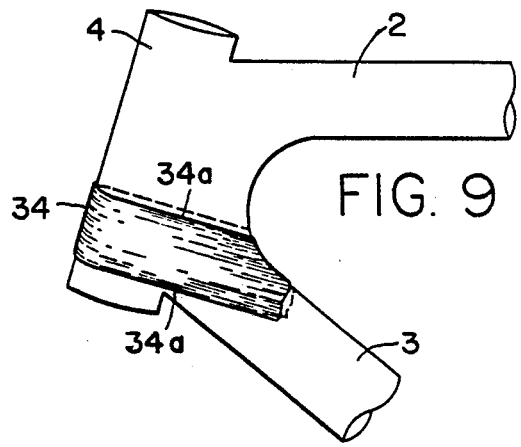
Figure 10:
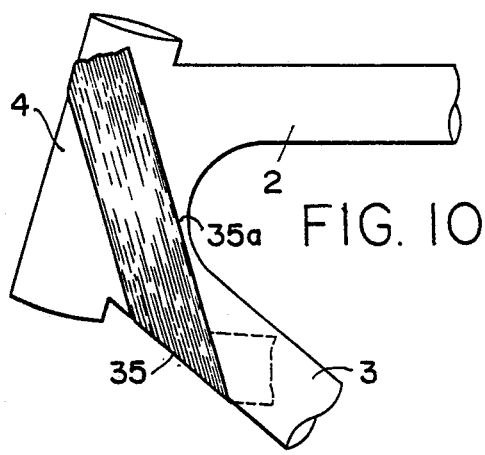
Figure 11:
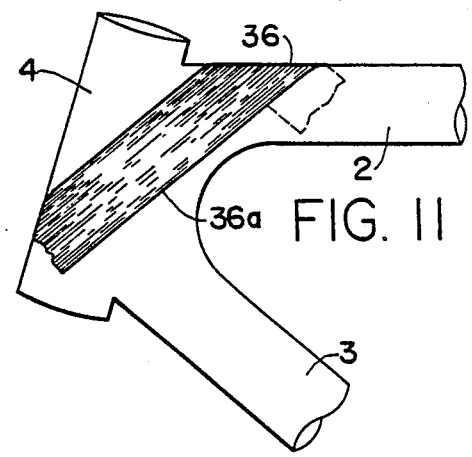

To give support across the middle of the aero tube structure a web member 93 as seen in FIG. 9 is made as another intermediate assembly. This web is also laid up on a mandrel having an external surface corresponding generally to the internal surface of the U-shaped web 93. The mandrel and the web 93 to be formed thereon have a length slightly greater than the length of the tube to be constructed. The web 93 has a main portion 93a which will extend across the aero tube structure and two portions 93b bent at approximately 90 degrees to the portion 93a to facilitate attaching the web 93 to the inner surfaces of the intermediate assembly 91.

In laying up the web structure on a mandrel the first layer for the entire cross section of the web comprises fibers which extend longitudinally of the aero tube, i.e., perpendicular to the plane of the drawing. The middle layer is composed of one layer of many short transverse fibers bent to the configuration of the cross section of the web 93 as seen in FIG. 29. The last layer to be laid up on the mandrel and the outer layer as seen in FIG. 29 is also arranged with the fibers extending longitudinally of the mandrel. These three layers, thoroughly wetted with epoxy, are tightly pressed to the mandrel by peel ply plastic as before and the peel ply tape and the intermediate assembly 93 are removed from the mandrel after the bonding epoxy has set.

Figure 29:
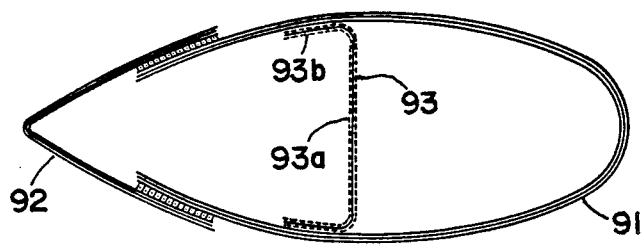
FIG. 29 is a section an intermediate assembly of the parts shown in FIG. 28 with the addition of a transverse reinforcing web.

To make the intermediate assembly shown in FIG. 29 the attaching portions 93b of the web 93 are coated on their outer surfaces with a pasty mixture of epoxy and microballoons and the web is inserted into the leading edge subassembly 91 so that the transverse web portion 93a will be in a position approximately half way between the leading and trailing edges of the aero tube. The outer surfaces of the leading edge part 91 are coated near their rear edges with similar microballoon epoxy mixture as are the forward inner surfaces of the trailing edge subassembly 92. The trailing edge part 92 is then positioned to engage the leading edge portion 91 with their adjacent edges overlapping sufficiently, about one-quarter inch, to form a good bond therebetween by means of the microballoon epoxy mixture. Before the microballoon epoxy mixture is set, the entire assembly, in the configuration shown in FIG. 29, is wrapped with a vinyl electrical tape and the assembly maintained in an absolutely straight configuration longitudinally of the aero tube until the epoxy mixture has completely set.

After the subassembly of FIG. 29 is set and the vinyl tape removed, its exterior surface is made as smooth as possible with slight sanding, particularly at the forward edges of the trailing edge portion 92, and the use of microballoon epoxy mixture to fill in or feather any irregularities in the surface, particularly at the seam area between the parts 91 and 92.

After smoothing out the intermediate assembly shown in FIG. 29 five additional layers are laid up on the exterior of this structure. The first two layers indicated at 94 in FIG. 30 are layers which are spiralled in opposite directions at an angle of approximately 30 degrees with respect to the axes of the tube structure, generally similar to the spiralled layers 11 and 12 in FIG. 4b. Three additional layers indicated at 95 are laid up with the carbon fibers extending parallel to the longitudinal axes of the aero tube structure. All of the fibers in the layers 94 and 95 are thoroughly wetted with epoxy before being laid up and are tightly pressed against the aero subassembly of FIG. 29 by peel ply tape to eliminate voids in the epoxy and to squeeze out and bleed out as much of the epoxy binder as possible to improve the fiber to epoxy ratio. After setting and removal of the peel ply tape the aero tube is lightly sanded to smooth it and prepare it for assembly into a frame structure.

An aero tube of greater strength and rigidity than that shown in FIG. 30 may be made in accordance with the illustration in FIG. 31 wherein the web structure 93 of FIG. 30 is replaced by a spar structure 96 having a boxlike cross section. The sequence of assembly of the aero tube in FIG. 31 is the same as that for the aero tube in FIG. 30 except that the boxlike spar structure 96 is laid up around the entire periphery of a waxed mandrel instead of along merely one side of a mandrel as in the fabrication of the web 93. The spar 96 comprises two inner layers 96a which extend around the entire periphery of the mandrel with the fibers extending longitudinally of the mandrel. On the sides of the mandrel corresponding to the front and rear of the aero tube a single layer 96b of short fibers extending transversely of the mandrel is next applied and this layer 96b is then covered with two additional layers as indicated at 96c with their fibers extending longitudinally of the mandrel. These multiple layers 96a, 96b and 96c are then tightly squeezed to the mandrel by peel ply tape until the remaining epoxy in this composite structure comprising these layers 96a, 96b and 96c is set. Although the web 93 is sufficiently elastic to allow it to be built up on a mandrel covered with a thin plastic film for separation, the spar 96 is built up on a waxed mandrel as previously described in connection with the making of round tubes. Upon removal of the peel ply tape and of the spar 96 from the waxed mandrel, the spar 96 is united in the overall assembly of FIG. 31 using the same steps as in making the structure of FIG. 30. In both of the structures of FIG. 30 and FIG. 31 the fibers in the central portion of the intermediate layer of the web 93 and the fibers in the intermediate layers 96b of the spar 96 all extend generally perpendicular to the outer surfaces of the aero tube structure and provide increased resistance to any inward movement of these outer walls towards each other and much greater strength and rigidity in the aero tube structure.

The aero tube structure shown in FIG. 32 is the same as that shown in FIG. 31 with the addition of three carbon fiber strip layers 97, 98 and 99 of different widths extending along the entire length of the aero tube structure. The fibers in each of these layers are oriented longitudinally of the aero tube. The layer 97 next to the three layers identified at 95 is the widest and layers 98 and 99 are progressively narrower. All three layers 97, 98 and 99 are located symmetrically with respect to the center of the aero tube at each side thereof. The layers 97, 98 and 99 may be fabricated with the tube at the same time the structure corresponding to that in FIG. 31 is fabricated. On the other hand, these layers may be added later to a tube as shown in FIG. 31 if need is found for further strengthening or stiffening of an aero tube in a particular application in a bicycle frame. When an aero top tube requires less resistance to torsional stresses, the spiral layers therein may be replaced with layers having fibers extending longitudinally of the tube or the spiral layers may be retained and the transverse web omitted.

It should be pointed out that the discontinuities and irregularities in the illustrations of FIGS. 29 through 32 have occurred or been exaggerated by the need for clearer illustration, but in actual manufacture the tubes are made with no voids and minimum discontinuities which are readily eliminated where necessary by sanding and application of microballoon epoxy mixtures. It should always be kept in mind that voids in the epoxy bonding material at the surfaces of carbon fibers are a principal source of reduced strength in the composite structures.

Figure 33:
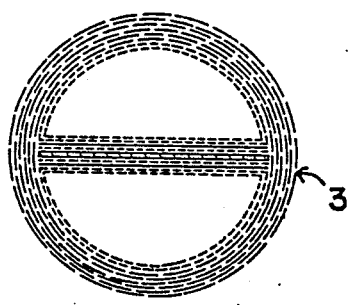
FIG. 33 is a cross section of a round down tube made in accordance with an alternative embodiment of the invention.

A round tube of increased strength, particularly for use as a down tube in a bicycle frame is illustrated in FIG. 33. The structure of FIG. 33 is made from two subassemblies of thin-walled tubular members each made on a waxed mandrel of D-shaped cross section. Each subassembly comprises two layers of longitudinally extending fibers completely around the mandrel, a further layer of transversely extending fibers parallel to the flat side of the D and another layer of longitudinally extending fibers along the flat side of the D and overlying the layer of transverse fibers. These layers are thoroughly wetted with epoxy and clamped to the mandrels by peel ply tape as previously described. After removal of the peel ply tape, and while still on the mandrels, the subassemblies are lightly sanded to remove any projecting discontinuities and are sanded flat on the straight side of the D. The subassemblies are then secured to each other to form the round tube by first coating the exterior of the thin wall portions which form the flat surfaces with epoxy, joining these flat surfaces and then filling any discontinuities at the edge of the joint with a microballoon epoxy mixture. Before this mixture is set six additional layers of carbon fiber material are added, each completely encircling the two joined D-shaped subassemblies. The first two additional layers are spiraled in opposite directions at an angle of approximately 30 degrees with respect to the longitudinal axes of this tube and the four outer layers have their fibers oriented longitudinally of the tube. Alternatively, the two 30 degree layers may be located as any of the first four of the six additional outer layers. The D-shaped preformed portions of the tube in FIG. 33 may be shaped to form preformed leading and trailing edge portions of an aero tube and be joined with their flat surfaces forming part of a transverse web.

The strips of unidirectional carbon fibers referred to throughout this specification have no weaving crimps and the unidirectional yarns in the strips have not been weakened by the abrasive actions present in a weaving process. The integrity of these fibers for handling purposes is maintained through very fine, adhesive coated fill or weft yarns of Nomex fiber that are bonded to, but not interwoven with, the unidirectional fibers of graphite. The adhesive binder on the fill yarns is compatible with the epoxy adhesive used in the bonding processes described herein. The fill yarns are spaced approximately 1.5 inches apart. All of the graphite fibers are spread evenly to maintain straightness and to provide thinness of the strips without gaps between the fibers. The fibers are surface treated to increase fiber-to-resin interfacial bond strength. A unidirectional carbon fiber fabric found suitable for use with this invention is commercially available under the name of ORCOWEB GRAPHITE G-450 from Orcon Corporation, Union City, Ca. In this fabric there are 6,000 strands per yarn and 9 yarns per inch of width. This provides 54,000 strands per inch. Each strand is 6.92 microns in diameter. Typical properties for the graphite fiber fabric are:

| | |
|---|---|
| Tensile strength (psi)* | 440,000 to 470,000 |
| Tensile modulus (psi)* | 33,000,000 to 34,000,000 |
| Ultimate elongation (percent)* | 1.2 to 1.4 |
| Electrical resistivity (ohm-mil-ft) | 9,000 |
| Weight (lb./sq. ft.) | 0.033 |
| Density (lb./cu. in.) | 0.063 |

*Impregnated strand test method.

Typical unidirectional composite properties for the carbon fiber material used herein when cured in an autoclave at room temperature using a general purpose epoxy at 60% fiber volume (approx. 75% by weight) are:

| | |
|---|---|
| Tensile strength (psi) | 250,000 to 255,000 |
| Tensile modulus (psi) | 21,000,000 |
| Tensile ultimate strain (percent) | 1.2 |
| Compressive strength (psi) | 156,000 to 175,000 |
| Compressive modulus (psi) | 20,000,000 |
| Flexural strength (4 pt.)(psi) | 280,000 to 289,000 |
| Flexural modulus (psi) | 19,000,000 |
| Interlaminar shear strength (psi) (Short Beam) | 11,000 to 14,000 |

If the composite is laid up by hand the maintenance of pressure by the peel ply tape is very important because the composite properties tabulated above are reduced dramatically if curing takes place without pressure and at room temperature at normal atmospheric pressure. Much of the reduction occurs from failure to eliminate excess epoxy and voids from the composite structure.

For a high impact composite structure having a slight degree of resiliency a suitable laminating resin is a product identified as 5420-A resin and 558-D hardener available commercially from Fiber-Resin Corporation, Burbank, Ca. The excellent penetration of this resin allows thinner, yet stronger, bond lines than possible with other adhesives.

Although the embodiments of the invention described herein have been found to be satisfactory using, for example, eight layers of carbon fibers in the various frame tubes made from the above ORCOWEB GRAPHITE G-450, a stronger frame or a lighter frame using slightly less material, i.e. using fewer of the straight layers 13 through 18 in addition to spiralled layers in FIG. 4a, may be built with similar bonding resin using a stronger and stiffer unidirectional carbon fiber strip material such as ORCOWEB GRAPHITE G-650, also from Orcon Corporation, which has the following properties:

| | |
|---|---|
| Tensile strength (psi) | 650,000 |
| Tensile modulus (psi) | 40,000,000 |

| | |
|---|---|
| Ultimate elongation (percent) | 1.6 |
| Weight (lb./sq. ft.) | 0.045 |
| Density (lb./cu. in.) | 0.0627 |

Typical unidirectional composite properties for the G-650 carbon fiber material using a general purpose epoxy at 60% fiber volume are:

| | |
|---|---|
| Tensile strength (psi) | 315,000 |
| Tensile modulus (psi) | 24,500,000 |
| Compressive strength (psi) | 197,000 |
| Compressive modulus (psi) | 18,700,000 |
| Flexural strength (psi) | 353,000 |
| Flexural modulus (psi) | 22,000,000 |
| Shear strength (Short beam)(psi) | 11,000 |

Filler material as described in this specification may consist of microballoon filled resin mixtures, automotive body putty, or metal filled epoxy mixtures. Such fillers vary in both density and resistance to compression. Microballoons are a commercially available product consisting of microscopic hollow phenolic plastic or glass spheres which, when added to a liquid resin mixture, result in an increased viscosity of the liquid resin and a decrease in density of the resin in its liquid or hardened state. A properly proportioned microballoonepoxy mixture is the least dense of the fillers described and has the least resistance to compression. Automotive body putty normally allows the quickest curing time of these fillers. One suitable body putty is Rogers Extra Light 4373 body putty. Body putty is lower in cost than a metal-filled epoxy and may be preferable where the higher resistance to compression of the metal-filled epoxy is not required.

Conventional high strength materials such as chrome-moly steel or 7075 or 2024 aluminum may be used for components such as the head tube.

After complete assembly of the frame it is cosmetically finished using commercially available materials. After a surface coating of a fine fill material, it is smoothed and polished and then coated with a finish of laquer or polyurethane.

What is claimed is:

1. A bicycle frame comprising a top tube member composed essentially of resin-impregnated carbon fibers, a down tube member composed essentially of resin-impregnated carbon fibers, a head tube member, means for securing said tube members together at said head tube member as an integral high strength structure consisting essentially of a plurality of integrally bonded strips of unidirectional carbon fibers, each of said strips overlying at least a portion of one of said carbon fiber tubes and said head tube and being bonded in said structure by a high strength resin.

2. A bicycle frame according to claim 1 wherein the width of said carbon fiber tube members transversely of the frame at the head tube member is less than the width of the head tube member, filler means at the junction of the carbon fiber tube members and said head tube member to provide a surface essentially tangent to the surface of the head tube member, a plurality of said strips each having an end portion overlying one of said carbon tube members, an intermediate portion overlying a portion of the surface of said filler means and a further portion overlying a portion of the head tube member, each such further portion being tangent to the head tube at the edge of said filler means.

3. A bicycle frame according to claim 1 wherein at least one of said strips extends from said top tube member around said head tube member and back to said top tube member, at least one of said strips extends on a first side of the frame from the top tube member around the head tube member and back on the other side of the frame to the down tube member, and at least one of said strips extends on said other side of the frame from said top tube member around the head tube member and back to the down tube member on said first side of the frame.

4. A bicycle frame according to claim 1 wherein the down tube member has an aero-configured cross section to reduce its wind resistance during forward movement of the bicycle frame.

5. A bicycle frame according to claim 1 wherein the top tube member is inclined downwardly and forwardly in normal use of the frame and has an aero-configured cross section to reduce its wind resistance during forward movement of the bicycle frame.

6. A bicycle frame according to claim 1 wherein each end of each said strip is positioned to overly one or the other of said carbon fiber tube members and a central portion of each strip is wrapped around the head tube member.

7. A bicycle frame comprising a generally cylindrical internally-threaded bottom bracket tube member, a carbon fiber seat tube member, a carbon fiber down tube member and two carbon fiber chainstay tube members, said carbon fiber tube members being secured to said bottom bracket member primarily by a high strength laid-up integrally bonded composite structure comprising a plurality of strips of resin-impregnated unidirectional carbon fibers.

8. A bicycle frame according to claim 7 wherein the primary securing means for attaching said carbon fiber tube members to said bracket member includes a plurality of strips of unidirectional carbon fibers with at least some of said strips overlying portions of at least two of said tube members.

9. A bicycle frame according to claim 7 wherein at least some of said strips overlie two carbon fiber tube members, the fibers in one end portion of each such strip which overlies two carbon fiber tube members being at angles not exceeding 45 degrees with respect to the axis of the respective carbon fiber tube member which said end portion overlies.

10. A bicycle frame according to claim 7 comprising on each side of the seat tube member at least one of said strips extending from the top of the chainstay member on that side of the frame around the respective end of the bottom bracket member to the bottom of that chainstay member.

11. A bicycle frame according to claim 10 wherein filler means is provided at each side of the seat tube member over the strips which wrap around the bracket member from the chainstay members, at least part of the others of said strips extending from a position overlying the seat tube member over part of said filler means and then over at least a part of one of the other tube members.

12. A bicycle frame according to claim 11 wherein some of said other strips extend along the seat tube member on opposite sides thereof and across the filler means with each strip of said some strips at least partially curving around the bottom bracket member.

13. A bicycle frame according to claim 10 wherein filler means is provided at each side of the down tube member over the strips which wrap around the bottom bracket tube member from the chainstay members, at least part of the others of said strips extending from a position overlying the down tube member over part of said filler means and then over at least a part of one of the other tube members.

14. A bicycle frame according to claim 13 wherein some of said other strips on opposite sides of the frame extend from said down tube member across the filler means, each of said some strips at least partially overlying the bottom bracket member at the other side of the frame.

15. A bicycle frame comprising a seat tube of aero configuration, seatstay and chainstay members extending rearwardly from an upper portion and from near the bottom respectively of the seat tube to the location for the rear axle of the bicycle, the seat tube having a straight leading edge portion, the seat tube having an upper trailing edge portion between the seatstay and chainstay members which is straight and parallel to said leading edge portion, the seat tube having opposite a portion of said leading edge, and below the straight trailing edge portion, an arcuate trailing edge portion, said arcuate portion having its center of curvature at the location of the axis of the rear axle.

16. A bicycle frame according to claim 15 wherein the front to rear dimension of the seat tube is about one third narrower along a line from the axis of the rear axle perpendicular to the leading edge than is the distance between the straight leading and trailing edge portions.

17. A bicycle frame according to claim 15 wherein the curvature of the arcuate trailing edge portion extends through an arc of at least 45 degrees.

18. A bicycle frame according to claim 15 wherein said arcuate trailing edge portion is a cylindrical surface.

19. A bicycle frame according to claim 15 wherein the ratio of the distance between the parallel leading and trailing edges to maximum thickness at a point about halfway between the parallel edges is about 3 to 1.

20. A bicycle frame according to claim 15 wherein the seat tube member interconnects a seat post socket and a bottom bracket member and a line from the center of the seat post socket to the center of the bottom bracket member is forward of the arcuate trailing edge of the seat tube member.

21. A bicycle frame tube consisting essentially of multiple layers of resin-impregnated carbon fibers and comprising at least two flat thin circumferentially continuous layers of unidirectional carbon fibers spirally wound in at least two opposite directions, a plurality of flat thin circumferentially continuous layers of unidirectional carbon fibers each wrapped with the fibers extending parallel to the tube, said plurality of layers constituting a majority of the layers and of the thickness of the tube, at least the two outer layers of the tube being such layers with fibers extending parallel to the tube.

22. A bicycle frame tube consisting essentially of multiple layers of resin-impregnated carbon fibers and comprising at least two flat thin strips of unidirectional carbon fibers spirally wound in at least two opposite directions with each strip defining a continuous layer of the tube, a plurality of flat thin strips of unidirectional carbon fibers each wrapped to define a further layer of the tube with the fibers extending parallel to the tube, said plurality of wrapped strips constituting a majority of the layers and of the thickness of the tube, at least the two outer layers of the tube being such wrapped strips.

23. A bicycle frame tube of aero configuration consisting essentially of multiple layers of resin-impregnated carbon fibers, the shape of said aero tube being defined essentially by a multi-layered preformed leading edge portion and a multi-layered preformed V-shaped trailing edge portion, said preformed portions being formed of layers of unidirectional carbon fibers and being bonded together, a plurality of additional layers each continuously surrounding the bonded preformed portions, said additional layers including at least two flat thin strips of unidirectional carbon fibers spirally wound in at least two opposite directions with each strip defining a continuous layer of the tube, a plurality of flat thin strips of unidirectional carbon fibers each wrapped to define a further layer of the tube with the fibers extending parallel to the tube, at least the outer two of said multiple layers of the tube being such wrapped strips.

24. A bicycle frame tube according to claim 23 wherein said tube has a transverse support structure extending longitudinally of the tube between the opposite walls of said leading edge portion.

25. A bicycle frame tube consisting essentially of multiple layers of resin-impregnated carbon fibers and comprising at least two flat thin strips of unidirectional carbon fibers spirally wound in at least two opposite directions with each strip defining a continuous layer of the tube, a plurality of flat thin strips of unidirectional carbon fibers each wrapped to define a further layer of the tube with the fibers extending parallel to the tube, at least the two outer layers of the tube being such wrapped strips, said tube having an aero configuration, said tube having a transverse support structure extending longitudinally of the tube between the opposite walls thereof.

26. A bicycle frame tube according to claim 25 wherein said support structure is made of resin-impregnated carbon fibers.

27. A bicycle frame tube according to claim 26 wherein said support structure is a box-like spar.

28. A bicycle frame tube according to claim 26 wherein said support structure is a transverse web.

29. A bicycle frame tube according to claim 25 wherein said aero tube is a down tube, said support structure being a box-like spar, a bracket secured on top of said spar for supporting at least one shift lever.

30. A bicycle frame tube according to claim 29 wherein said bracket includes means for mounting two shift levers in tandem.

31. A bicycle frame tube according to claim 30 wherein said bracket is recessed within the tube whereby the mounting ends of the shift levers are kept out of the air flow path around the tube while the bicycle is being ridden.

32. A bicycle frame comprising a carbon fiber seat tube, a carbon fiber top tube, and carbon fiber seatstay means, said tubes and said stay means being united as an integral high strength composite structure by means of a plurality of layers of carbon fiber laid up across the junctions of the tubes and the stay means, said layers including a plurality of thin flat strips of unidirectional carbon fibers wrapped with portions of each strip overlying portions of at least two of the top tube, the seat tube and the stay means.

33. A bicycle frame according to claim 32 wherein said layers include a layer of bias-cut carbon fiber fabric laid up at the interior corner of the frame formed by the junction of the seat tube with the rear end of the top tube.

34. A bicycle frame seat tube consisting essentially of multiple layers of resin-impregnated carbon fibers and comprising at least two flat thin strips of unidirectional carbon fibers spirally wound in at least two opposite directions with each stip defining a continuous layer of the tube, a plurality of flat thin strips of unidirectional carbon fibers each wrapped to define a further layer of the tube with the fibers extending parallel to the tube, a bracket secured to said tube for mounting a front derailleur, said bracket comprising a first plate-like member having a curved surface conforming to an outer surface of said tube and a second member having a surface with greater curvature with edge portions thereof brazed to said first member and central portions spaced from said first member to provide a hollow space therebetween, a high tensile strength composite laminate overlying said bracket and bonded thereto and to said tube, bracket comprising a third member extending from said second member through said laminate for supporting said derailleur.

35. A bicycle frame joint comprising two integrally joined tubular members of composite construction, said members being of different cross sectional dimensions at the joint, adhesive means including relatively high tensile strength strips of unidirectional carbon fibers for securing said members to each other at said joint, filler means for evening the dimensions of said members at said joint to provide non-concave surfaces at said joint, said strips having end portions bonded to each of said members and other portions extending across said filler means at said joint to provide a high strength means for securing said members to each other, said strips being supported by said filler means and said members so that said strips are essentially non-concave on their outer surfaces.

36. A bicycle frame joint comprising two integrally joined tubular members of composite construction, said members providing indented surfaces at said joint which preclude direct application of thin joining strips of carbon fibers across the joint without external indentations in the fiber strips, means for securing said members to each other at said joint, filler means for evening the indented surfaces of said members at said joint to provide nonconcave surfaces at said joint, relatively high tensile strength strips of unidirectional carbon fibers bonded to each of said members and extending across said filler means at said joint to provide a high strength means for securing said members to each other, said strips being supported by said filler means and said members so that they have essentially non-concave external surfaces.

37. A bicycle frame seat tube consisting essentially of multiple layers of resin-impregnated carbon fibers and comprising a plurality of flat thin strips of unidirectional carbon fibers each wrapped to define a layer of the tube with the fibers extending parallel to the tube, said seat tube having a transverse web of resin impregnated carbon fibers bonded to the inner walls of the tube and extending upwardly from its lower end approximately one third of the length of the seat tube.

38. A bicycle frame tube comprising two tubular members each having a flat surface extending lengthwise of said tube, each such flat surface being formed by a thin wall portion of the respective tubular member, means bonding said flat surfaces together along the length of the tube, a plurality of layers of resin-impregnated carbon fiber strips wrapped around both of said tubular members and bonded thereto by said resin.

39. A bicycle frame tube according to claim 38 wherein each of said tubular members has a D-shaped cross section.

40. A bicycle frame tube according to claim 38 wherein the cross section of said tubular members together define an aero cross section for said tube, said flat surfaces forming a web across said aero cross section.

* * * * *